US009826873B2

United States Patent
Abe et al.

(10) Patent No.: US 9,826,873 B2
(45) Date of Patent: Nov. 28, 2017

(54) TRAVELING BODY DEVICE

(71) Applicant: TOSHIBA LIFESTYLE PRODUCTS & SERVICES CORPORATION, Ome-shi (JP)

(72) Inventors: Kouichi Abe, Owariasahi (JP); Susumu Hoshino, Owariasahi (JP)

(73) Assignee: TOSHIBA LIFESTYLE PRODUCTS & SERVICES CORPORATION, Ome-shi (JP)

( * ) Notice: Subject to any disclaimer, the term of this patent is extended or adjusted under 35 U.S.C. 154(b) by 16 days.

(21) Appl. No.: 15/102,763

(22) PCT Filed: Nov. 26, 2014

(86) PCT No.: PCT/JP2014/081201
§ 371 (c)(1),
(2) Date: Jun. 8, 2016

(87) PCT Pub. No.: WO2015/087697
PCT Pub. Date: Jun. 18, 2015

(65) Prior Publication Data
US 2016/0309974 A1   Oct. 27, 2016

(30) Foreign Application Priority Data

Dec. 13, 2013   (JP) ................................ 2013-258573
Dec. 25, 2013   (JP) ................................ 2013-267413

(51) Int. Cl.
*A47L 9/28*   (2006.01)
*G05D 1/00*   (2006.01)
(Continued)

(52) U.S. Cl.
CPC .............. *A47L 11/4011* (2013.01); *A47L 9/28* (2013.01); *A47L 11/24* (2013.01);
(Continued)

(58) Field of Classification Search
CPC .............. A47L 9/28; A47L 11/14; G05D 1/00
(Continued)

(56) References Cited

U.S. PATENT DOCUMENTS 8,374,721 B2 * 2/2013 Halloran .................. A47L 9/009
  318/568.1
2002/0049522 A1 * 4/2002 Ruffner ................ A01B 69/008
  701/23
(Continued)

FOREIGN PATENT DOCUMENTS

JP   2001-300874 A   10/2001
JP   2002-92762 A    3/2002
(Continued)

OTHER PUBLICATIONS

International Search Report dated Feb. 24, 2015 in PCT/JP2014/081201 Filed Nov. 26, 2014.

*Primary Examiner* — Tan Q Nguyen
(74) *Attorney, Agent, or Firm* — Oblon, McClelland, Maier & Neustadt, L.L.P.

(57) ABSTRACT

Provided is an electric cleaning device capable of easily and reliably directing a camera toward an object and imaging the object. An electric cleaning device includes an electric vacuum cleaner main body capable of autonomously traveling, and a charging device that guides the electric vacuum cleaner main body, and can image an object. A control part has an imaging mode in which the control part makes a main body case travel so as to approach the charging device in line with guide signals received by a light receiving part, and performs imaging in a set direction with a camera based on the guide signals when the main body case reaches a position at a predetermined distance from the charging device.

11 Claims, 15 Drawing Sheets

(51) Int. Cl.
  *A47L 11/40* (2006.01)
  *G05D 1/02* (2006.01)
  *A47L 11/24* (2006.01)
  *B60L 11/18* (2006.01)

(52) U.S. Cl.
  CPC ....... *A47L 11/4041* (2013.01); *B60L 11/1827* (2013.01); *G05D 1/0011* (2013.01); *G05D 1/0094* (2013.01); *G05D 1/0225* (2013.01); *G05D 1/0234* (2013.01); *G05D 1/0242* (2013.01); *G05D 1/0246* (2013.01); *A47L 2201/02* (2013.01); *A47L 2201/022* (2013.01); *A47L 2201/04* (2013.01); *G05D 2201/0215* (2013.01)

(58) Field of Classification Search
  USPC .......................................... 701/23, 24, 26, 28
  See application file for complete search history.

(56) References Cited

U.S. PATENT DOCUMENTS

| | | |
|---|---|---|
| 2005/0120505 A1 | 6/2005 | Tani |
| 2005/0237188 A1 | 10/2005 | Tani |
| 2005/0251312 A1 | 11/2005 | Tani |
| 2012/0221187 A1* | 8/2012 | Jeon ........................ A47L 9/009 701/26 |

FOREIGN PATENT DOCUMENTS

| | | |
|---|---|---|
| JP | 2003-136455 A | 5/2003 |
| JP | 2004-101616 A | 4/2004 |
| JP | 2013-235351 A | 11/2013 |

\* cited by examiner

TRAVELING BODY DEVICE

TECHNICAL FIELD

An embodiment of the present invention relates to a traveling body device including an autonomously traveling body capable of autonomously traveling and a beacon device that guides this autonomously traveling body.

BACKGROUND ART

Conventionally, a so-called autonomously traveling electric vacuum cleaner (cleaning robot) that cleans a floor surface as a surface to be cleaned while autonomously traveling on the floor surface and detecting obstacles, etc., by using, for example, a sensor, etc., is known. In recent years, there is a system that uses such an electric vacuum cleaner and is constituted so as to make the electric vacuum cleaner travel inside a room by remotely controlling it with a mobile terminal and image the conditions inside the room with a camera to enable monitoring and confirmation of the conditions in a user's home (for example, whether windows are left open and whether lights are left turned on, etc.) and the condition of a user's pet while the user is out.

CITATION LIST

Patent Literature

PTL 1: Japanese Laid-Open Patent Publication No. 2002-92762

SUMMARY OF INVENTION

Technical Problem

To use the above-described system, the arrangement and layout etc., inside the room must be input into the system in advance to enable imaging of a desired position, so that the system is not always convenient.

An object to be achieved by the present invention is to provide a traveling body device capable of easily and reliably directing an imaging part toward an object and imaging the object.

Solution to Problem

A traveling body device according to an embodiment includes an autonomously traveling body capable of autonomously traveling and a beacon device that guides this autonomously traveling body, and can image an object. The beacon device includes a transmitting part that transmits guide signals for guiding the autonomously traveling body corresponding to a set direction that is to be directed toward an object. The autonomously traveling body includes a main body case, drive wheels, a control part, and a receiving part. The main body case includes an imaging part that images an object. The drive wheels enable the main body case to travel. The control part makes the main body case autonomously travel by controlling driving of the drive wheels. The receiving part receives guide signals transmitted by the transmitting part. The control part has an imaging mode in which the control part makes the main body case travel so as to approach the beacon device in line with the guide signals received by the receiving part, and performs imaging in a set direction by the imaging part based on the guide signals when the main body case reaches a position at a predetermined distance from the beacon device.

DESCRIPTION OF EMBODIMENTS

Figure 1:
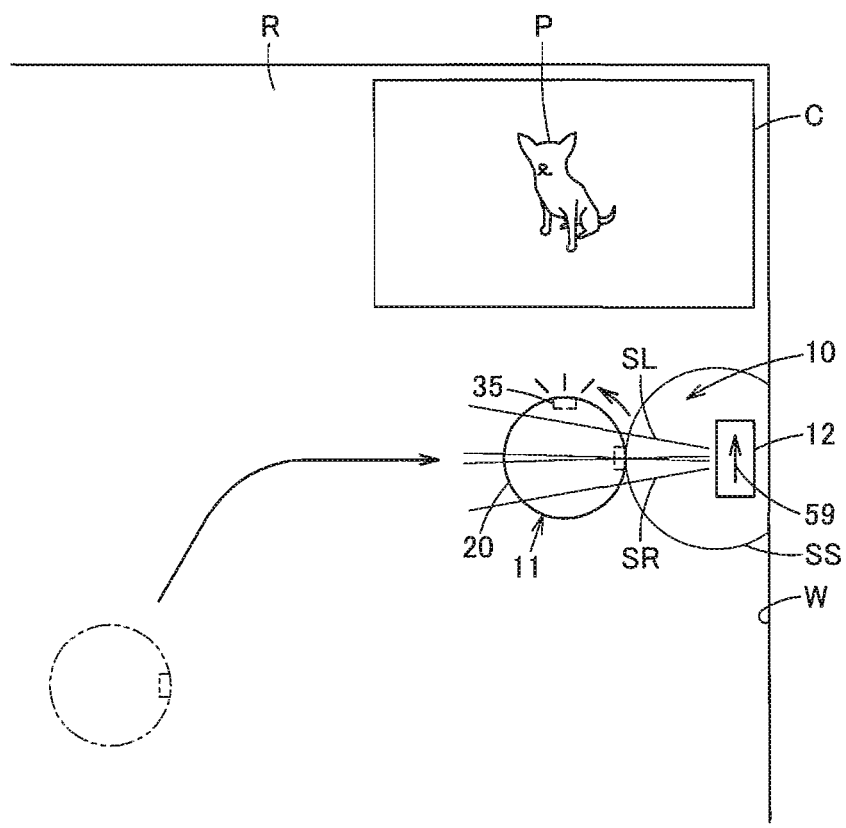
FIG. 1 is a plan view schematically showing movement of an autonomously traveling body of a traveling body device according to a first embodiment.
Figure 2A:
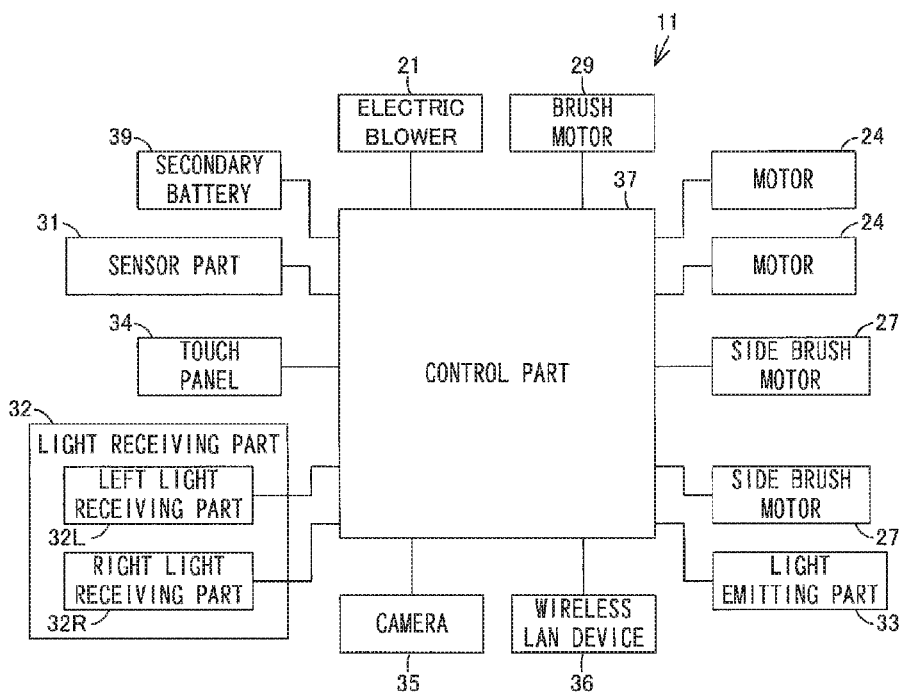
FIG. 2A is a block diagram showing an internal structure of the autonomously traveling body of the same traveling body device.
Figure 2B:
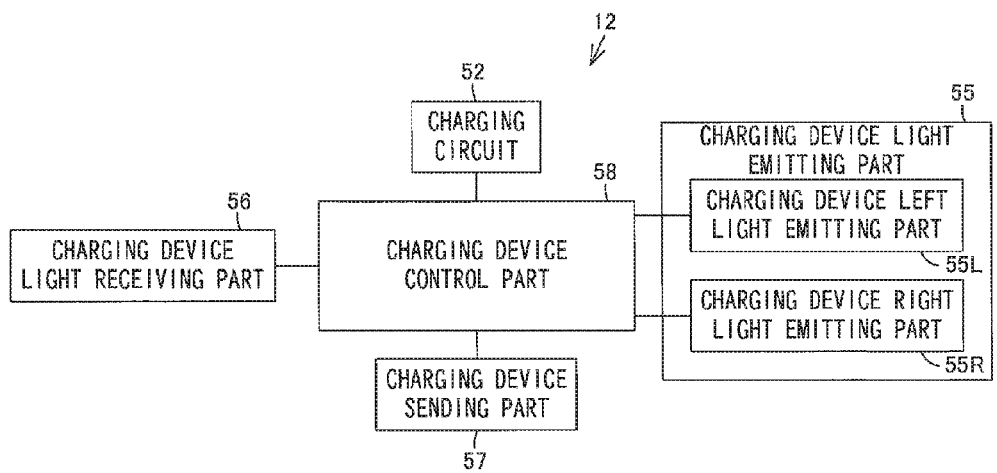
FIG. 2B is a block diagram showing an internal structure of a beacon device of the same traveling body device.
Figure 3:
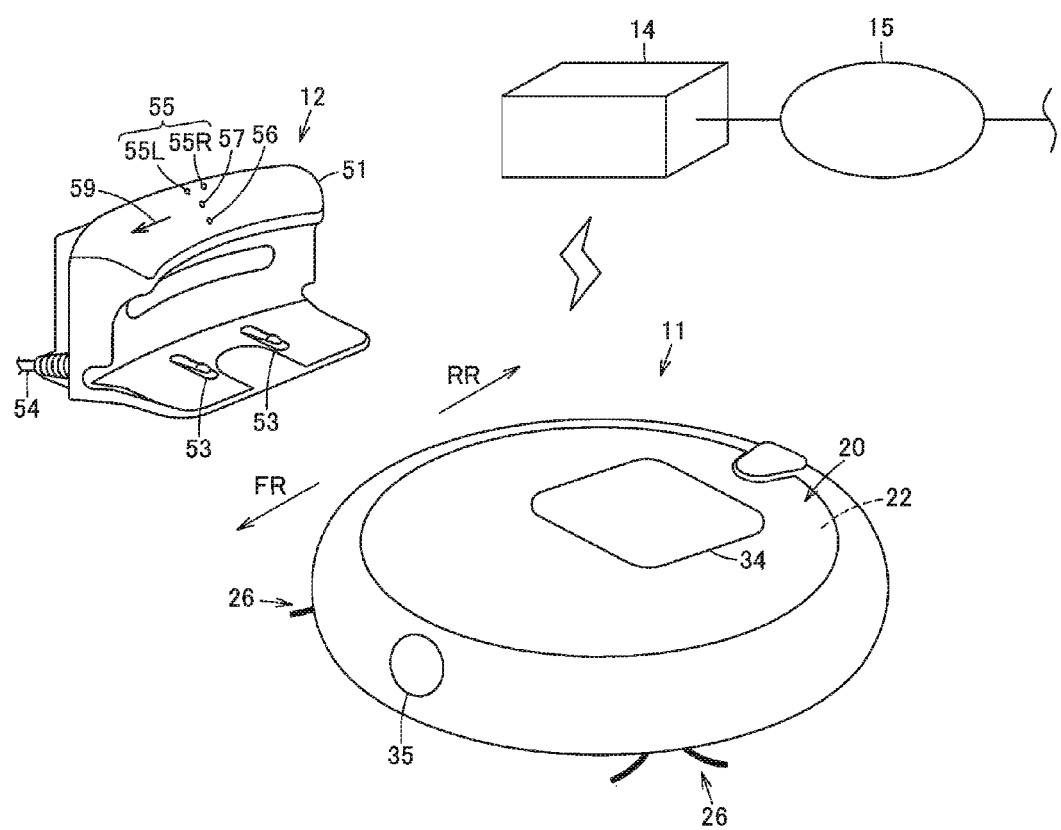
FIG. 3 is a perspective view showing the same traveling body device.
Figure 4:
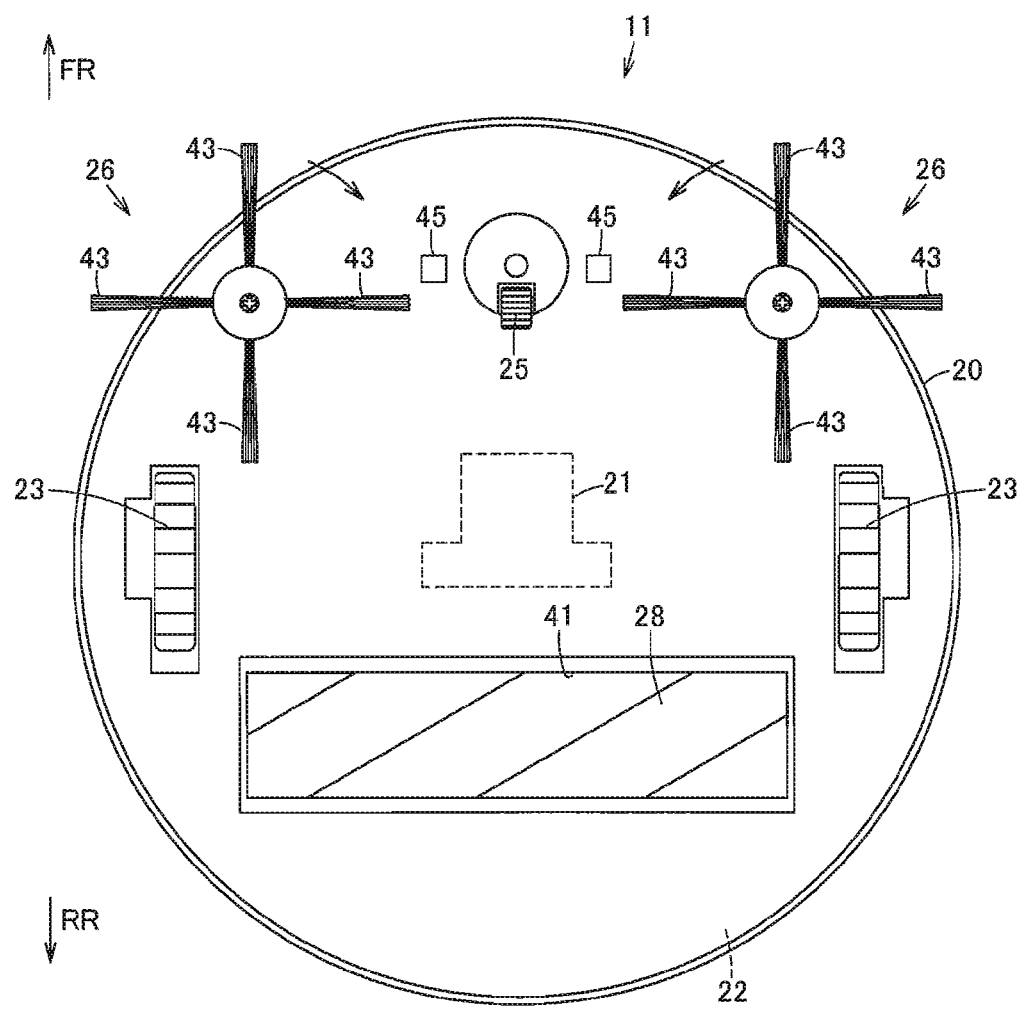
FIG. 4 is a plan view showing the same autonomously traveling body from below.

Hereinafter, a constitution of a first embodiment is described with reference to the drawings.

In FIG. 1 to FIG. 5, the reference symbol 10 denotes an electric cleaning device as a traveling body device, and this electric cleaning device 10 includes an electric vacuum cleaner main body 11 as an autonomously traveling body, and a charging device (charging base) 12 that serves as a base part for charging the electric vacuum cleaner main body 11, and serves as a beacon device that guides the electric vacuum cleaner main body 11. The electric vacuum cleaner main body 11 can wirelessly communicate with an external device (not shown) via a (external) network 15 such as the Internet by communicating (transmitting and receiving)

with, for example, an access point 14 as a relay unit (relay part) disposed inside a room R, etc., by using wireless communication such as Bluetooth (registered trademark).

This electric vacuum cleaner main body 11 is, in the present embodiment, a so-called self-traveling robot cleaner that cleans a floor surface while autonomous traveling (self-traveling) on the floor surface as a surface to be cleaned. This electric vacuum cleaner main body 11 includes, as traveling and cleaning parts, a hollow main body case 20, an electric blower 21 as an operating part (cleaning part) housed inside the main body case 20, a dust collecting part 22 communicating with the suction side of this electric blower 21, for example, a plural plurality (pair) of drive wheels 23 and 23 as drive parts for traveling, motors 24 and 24 that are drive units as operating parts to drive these drive wheels 23 and 23, a turning wheel 25 for turning, for example, a plurality (pair) of side brushes 26 and 26 that are auxiliary cleaning units (auxiliary cleaning parts) as turning cleaning parts (cleaning parts) disposed on the lower portion of the main body case 20 turnably along the floor surface, side brush motors 27 and 27 that are turning drive units (turning drive parts) as operating parts (cleaning parts) that turn these side brushes 26 and 26, a rotary brush 28 that is a cleaning unit as a rotary cleaning body (cleaning part) disposed rotatably on the lower portion of the main body case 20, and a brush motor 29 that is a rotary drive unit (rotary drive part) as an operating part (cleaning part) that drives the rotary brush 28 to rotate, etc. This electric vacuum cleaner main body 11 further includes, as input/output and control parts, a sensor part 31 as an operating part including various sensors, a light receiving part 32 that is a traveling body side receiving unit (traveling body side receiving part) as a receiving unit (receiving part), a light emitting part 33 that is a traveling body side transmitting unit (traveling body side transmitting part), a touch panel 34 having the functions of an input operation unit (input operating part) and a display unit (display part), a camera 35 as an imaging unit (imaging part), a wireless LAN device 36 that is a wireless communication unit (wireless communicating part), and a control part 37 as a control unit constituted by a circuit board, etc., and so on. This electric vacuum cleaner main body 11 includes a secondary battery 39 that supplies power to the respective parts described above in the main body case 20. In the description given hereinafter, a direction along a traveling direction of the electric vacuum cleaner main body 11 (main body case 20) is referred to as a front-rear direction (arrow FR, RR directions shown in FIG. 3, etc.), and the left-right direction (direction between both sides) crossing (orthogonal to) the front-rear direction is referred to as a width direction.

The main body case 20 is formed into a flat columnar (discoid) shape, etc., from, for example, a synthetic resin, etc., and at a position close to the rear portion of the central portion in the width direction of the circular lower surface, a suction port 41 that is longitudinal in the width direction, that is, horizontally long is opened. On this main body case 20, the camera 35 is disposed.

The suction port 41 communicates with the suction side of the electric blower 21 via the dust collecting part 22. In this suction port the rotary brush 28 is disposed rotatably.

The electric blower 21 generates a negative pressure by being driven and sucks dust from the suction port 41 into the dust collecting part 22, and is housed inside the main body case 20 so that, for example, the suction side is directed rearward and the axial direction is along the front-rear direction (horizontal direction). This electric blower 21 may become unnecessary in, for example, a constitution in which dust is scraped up into the dust collecting part 22 by the rotary brush 28, etc., and is not an essential component.

The dust collecting part 22 collects dust sucked from the suction port 41 according to driving of the electric blower 21, and is positioned at, for example, the rear portion of the main body case 20, and is attachable to and detachable from the main body case 20.

The drive wheels 23 make the electric vacuum cleaner main body 11 (main body case 20) travel (autonomously travel) in the forward direction and the backward direction on a floor surface, that is, are for traveling, and are formed into discoid shapes having rotary axes (not shown) along the left-right width direction. These drive wheels 23 are disposed at positions that are on both lateral sides lateral to the suction port 41 near the center in the front-rear direction of the lower portion of the main body case 20 so as to be separated from each other in the width direction, and these positions are symmetrical in the width direction.

The motors 24 are disposed, for example, corresponding to the drive wheels 23, respectively, and can drive the drive wheels 23 independently from each other. These motors 24 may be directly connected to the drive wheels 23, respectively, or may be connected to the drive wheels 23 via transmission units (transmission parts) (not shown) such as gears or belts.

The turning wheel 25 is at a position that is the substantially central portion in the width direction and the front portion of the main body case 20, and is a driven wheel turnable along a floor surface.

Each side brush 26 has a plurality of (for example, three) brush bristles 43 as cleaning bodies that project radially and come into contact with the floor surface. The side brushes 26 and 26 are disposed at positions that are on the front sides of the drive wheels 23 and 23 on the main body case 20 and are on both lateral sides lateral to the rear side of the turning wheel 25.

The side brush motors 27 can rotate the side brushes 26, respectively, toward the central side in the width direction of the main body case 20, in other words, rotate the right side brush 26 counterclockwise and the left side brush 26 clockwise, that is, so as to gather up dust to the suction port 41 side by the side brushes 26.

These side brushes 26 and side brush motors 27 are not essential components as long as cleaning can be sufficiently performed with the electric blower 21 or the rotary brush 28.

The rotary brush 28 is formed to be long, and has both end portions axially supported rotatably on both side portions in the width direction of the suction port 41. This rotary brush 28 projects to the lower side of the lower surface of the main body case 20 from the suction port 41, and is constituted so that its lower portion comes into contact with a floor surface and scrapes up dust in the state where the electric vacuum cleaner main body 11 is placed on the floor surface.

The brush motor 29 is housed inside the main body case 20, and connected to the rotary brush 28 via a gear mechanism (not shown) as a mechanical part.

These rotary brush 28 and brush motor 29 are not essential components as long as cleaning can be sufficiently performed with the electric blower 21 or the side brushes 26 and 26.

The sensor part 31 has functions of, for example, a number-of-rotations sensor such as an optical encoder that measures the numbers of rotations of the motors 24, an obstacle detection unit (obstacle sensor (ranging sensor)) such as an infrared sensor that detects obstacles such as walls and furniture, a level difference detection unit (level difference sensor) such as an infrared sensor that detects level differences, etc., of a floor surface, and a collision prevention detection unit (collision prevention sensor) such as an infrared sensor for preventing a collision with the charging device 12, etc., and is disposed on the respective portions such as the upper portion, the outer circumferential portion (front portion and rear portion), and the lower portion of the main body case 20.

The light receiving part 32 is for estimating the position of the charging device 12 by detecting infrared rays, etc., emitted from the charging device 12, and for example, at positions separated left and right with respect to the central portion in the left-right direction of the front portion of the outer circumferential portion of the main body case 20, a left light receiving part 32L and a right light receiving part 32R are disposed. These light receiving parts 32L and 32R are disposed, for example, bilaterally symmetrically.

The light emitting part 33 emits infrared rays, etc., toward the charging device 12, and is disposed on, for example, the upper portion of the main body case 20.

The touch panel 34 is a part into which a user can directly input various settings, and which displays various information relating to the electric vacuum cleaner main body 11, and is disposed on, for example, the upper position of the main body case 20.

The camera 35 is a digital still camera that images an image in a predetermined direction, that is, in the present embodiment, in a region from the front side to the upper front side of the main body case 20, and is disposed on, for example, the outer circumferential portion or the upper portion, etc., of the main body case 20 at the central portion in the left-right direction of the front portion of the main body case 20, that is, the front face portion of the main body case 20. This camera 35 can digitize an imaged image and output it to the control part 37.

The wireless LAN device 36 is for wirelessly communicating with an external device via the access point 14 and the network 15. Therefore, via this wireless LAN device 36, various information can be received from the network 15, and various information can be input from an external device (external terminal), for example, a smart phone, etc. That is, this wireless LAN device 36 has functions of an external signal receiving unit (external signal receiving part) that receives external signals output from an external device and transmitted from the access point 14 via the network 15 and a signal receiving unit (signal receiving part).

The control part 37 includes a CPU being a control part main body as a control unit main body, a ROM being a storage part storing fixed data such as programs to be read by the CPU, a RAM being an area storage part that dynamically forms various memory areas such as work areas serving as working spaces for data processing to be performed by the programs, a memory being a memory unit that stores, for example, image data imaged with the camera 35, and a timer that clocks calendar information such as a current date and time etc. This control part 37 is electrically connected to the electric blower 21, the motors 24, the side brush motors 27, the brush motor 29, the sensor part 31, the light receiving part 32, the light emitting part 33, the touch panel 34, the camera 35, and the wireless LAN device 36, etc., and has a cleaning mode in which the control part 37 controls driving of the electric blower 21, the motors 24, the side brush motors 27, and the brush motor 29, etc., based on results of detection performed by the sensor part 31, a charging mode in which the control part 37 performs charging of the secondary battery 39 via the charging device 12, an imaging mode in which the control part 37 performs imaging with the camera 35 in response to an external signal, and a standby mode while waiting for operation.

The secondary battery 39 supplies power to the electric blower 21, the motors 24, the side brush motors 27, the brush motor 29, the sensor part 31, the light receiving part 32, the light emitting part 33, the camera 35, the wireless LAN device 36, and the control part 37, etc. This secondary battery 39 is electrically connected to charging terminals 45 that are exposed to, for example, both sides of the turning wheel 25, that is, the front portion of the lower surface of the main body case 20.

On the other hand, the charging device 12 includes a charging device case 51 as a beacon device case, a charging circuit 52 housed in this charging device case 51, terminals for charging 53 electrically connected to the charging circuit 52, a power supply cord 54 to be connected to a commercial power supply, a charging device light emitting part 55 that is a beacon device side transmitting unit (beacon device side transmitting part) as a transmitting unit (transmitting part) that outputs various signals such as positional information of the charging device 12 by using, for example, infrared rays, a charging device light receiving part 56 that is a beacon device side receiving unit (beacon device side receiving part) that receives light emitted from the light emitting part 33 of the electric vacuum cleaner main body 11, a charging device sending part 57 that is a beacon device side sending-out unit (beacon device side sending-out part) that outputs a collision prevention signal SS to the surrounding area of the charging device 12 by using, for example, infrared rays, and a charging device control part 58 being a beacon device control unit (beacon device control part) that controls operations of the charging device light emitting part 55, the charging device light receiving part 56, and the charging device sending part 57, etc., and so on.

The charging device case 51 (charging device 12) has, for example, on its upper portion, a direction indicating part 59 as a direction indicating unit that indicates a set direction that is to be directed toward an object P, and is disposed at a position that does not obstruct cleaning, such as the vicinity of a wall portion W that partitions the room R so that the direction indicated by the direction indicating part 59 is directed toward the object P.

Here, the direction indicating part 59 is, for example, in the present embodiment, an arrow that indicates a direction, however, for example, the direction indicating part 59 may be a mark such as an icon disposed on a surface positioned in a direction that the direction indicating part 59 indicates, and it is also possible that, for example, a portion of the charging device case 51 is changed color to indicate the direction, or the direction is indicated by the shape of the charging device case 51. That is, the direction indicating part 59 sets a set direction that is to be directed toward an object P in the charging device 12 in advance. Therefore, the direction indicating part 59 may utilize as is a structure or a shape, etc., that the charging device 12 is equipped with in advance as long as a user can identify the set direction.

The charging circuit 52 is a constant current circuit, etc., that charges the secondary battery 39 of the electric vacuum cleaner main body 11 in a state where the charging terminals 45 thereof are connected to the terminals for charging 53.

The terminals for charging 53 are exposed to the lower portion of the charging device case 51, and to these terminals, the charging terminals 45 of the electric vacuum cleaner main body 11 that moved (returned) to the charging device 12 are mechanically and electrically connected.

The power supply cord 54 is electrically connected to the charging circuit 52, the charging device light emitting part 55, the charging device light receiving part 56, the charging device sending part 57, and the charging device control part 58, and can supply power from a commercial power supply by being connected to an outlet installed on the wall portion W, etc.

The charging device light emitting part 55 emits guide signals of infrared rays, etc., in a direction having a predetermined relationship (direction at a predetermined angle) with a direction indicated by the direction indicating part 59, that is, in the present embodiment, in a direction crossing at 90 degrees to the direction indicated by the direction indicating part 59 to the electric vacuum cleaner main body 11, at is, transmits guide signals corresponding to the direction indicated by the direction indicating part 59, and a charging device left light emitting part 55L and a charging device right light emitting part 55R are disposed at, for example, positions separated from each other at the central portion of the side portion of the charging device case 51. This charging device light emitting part 55 may always emit light, or may emit light when, for example, the charging device light receiving part 56 receives light emitted from the light emitting part 33 of the electric vacuum cleaner main body 11.

The charging device light receiving part 56 is for grasping the positional relationship between the electric vacuum cleaner main body 11 and the charging device 12 by detecting infrared rays, etc., emitted from the light emitting part 33 of the electric vacuum cleaner main body 11, and is disposed on, for example, the upper portion of the charging device case 51.

The charging device sending part 57 outputs a collision prevention signal SS to, for example, a position a predetermined radius (for example, approximately 30 cm) around the charging device 12 to prevent the electric vacuum cleaner main body 11 from getting any closer to the charging device 12, and is disposed on, for example, the central portion, etc., of the upper portion of the charging device case 51.

The charging device control part 58, for example, generates an infrared signal to be emitted from the charging device light emitting part 55, and processes an infrared signal received by the charging device light receiving part 56 from the light emitting part 33 of the electric vacuum cleaner main body 11. This charging device control part 58 has a charging mode for charging the secondary battery 39 via the charging circuit 52, an imaging mode in which the charging device control part 58 guides the electric vacuum cleaner main body 11 to a position at which the electric vacuum cleaner main body 11 can perform imaging with the camera 35, and a standby mode while waiting for operation.

Figure 6:
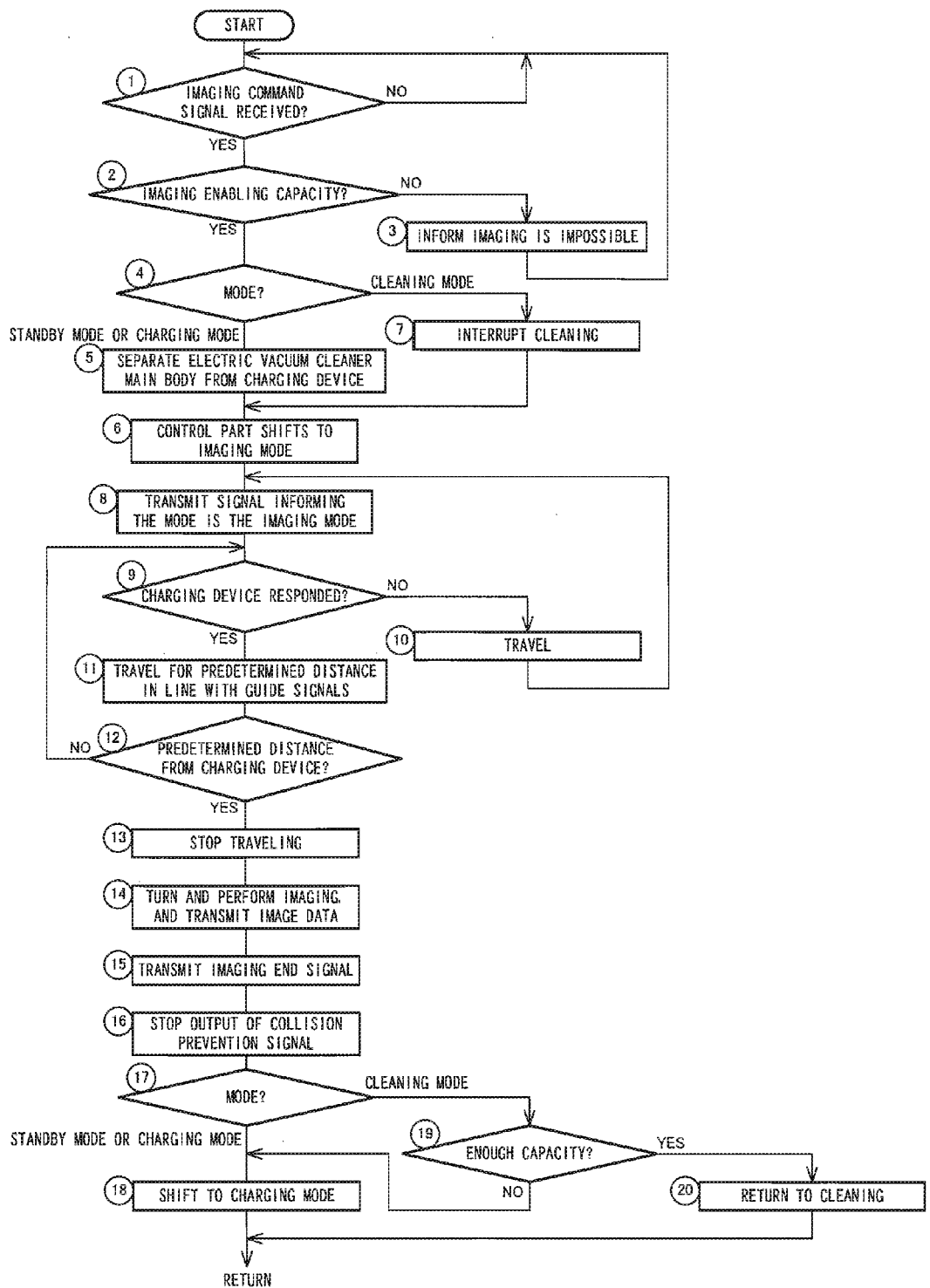
FIG. 6 is a flowchart showing a portion of control of the same traveling body device.

Next, operation of the first embodiment described above is described with reference to the flowchart shown in FIG. 6 as well.

Generally, the autonomously traveling electric vacuum cleaner main body 11 performs operations that are roughly divided into a cleaning operation by the electric vacuum cleaner main body 11, and a charging operation for charging the secondary battery 39 by the charging device 12, however, in the present embodiment, in addition to these operations, the electric vacuum cleaner main body 11 performs an imaging operation for imaging an object P (for example, a pet such as a dog in a cage C).

(Cleaning Operation)

In the electric vacuum cleaner main body 11, when a cleaning start time set in advance begins, the control part 37 that has switched from the standby mode to the cleaning mode drives the electric blower 21, the drive wheels 23 and 23 (motors 24 and 24), the side brushes 26 and 26 (side brush motors 27 and 27), and the rotary brush 28 (brush motor 29), etc., and the electric vacuum cleaner main body 11 separates from, for example, the charging device 12 and starts cleaning while autonomously traveling on a floor surface by the drive wheels 23 and 23. The cleaning start position can be set to an arbitrary position such as a traveling start position of the electric vacuum cleaner main body 11 or a doorway of the room R, etc.

During traveling, the control part monitors the traveling state of the electric vacuum cleaner main body 11 (main body case 20) by detecting, for example, distances from wall portions surrounding the periphery of the cleaning region and obstacles inside the cleaning region and level differences of the floor surface, etc., via the sensor part 31, and by driving the drive wheels 23 and 23 (motors 24 and 24) according to the detection by the sensor part 31, makes the electric vacuum cleaner main body 11 travel on the floor surface while avoiding the obstacles and level differences, etc.

Then, this electric vacuum cleaner main body 11 scrapes dust into the suction port 41 by the side brushes 26 and 26 driven to turn, and sucks dust on the floor surface together with air from the suction port 41 to which a negative pressure generated by driving of the electric blower 21 is applied via the dust collecting part 22. In addition, the rotary brush 28 being driven to rotate scrapes dust on the floor surface into the dust collecting part 22.

Dust sucked from the suction port 41 together with air is separated and collected into the dust collecting part 22, and the air from which the dust was separated sucked into the electric blower 21 and cools the electric blower 21, and then becomes exhaust wind and is exhausted to the outside from an exhaust port (not shown) provided in the main body case 20.

Under a predetermined condition such as a condition where cleaning of the cleaning region has been completed or the capacity of the secondary battery 39 has lowered to a predetermined capacity and is not enough to complete cleaning (the voltage of the secondary battery 39 has lowered close to a discharge cutoff voltage), the control part 37 transmits a request signal for requesting ending of the cleaning mode and shifting to the charging mode from the light emitting part 33. In the charging device 12 that received this request signal by the charging device light receiving part 56, the charging device control part 58 transmits a return signal to guide the electric vacuum cleaner main body 11 so as to make the electric vacuum cleaner main body 11 return (move) to the charging device 12 from the charging device light part 55. Then, the electric vacuum cleaner main body 11 that received this return signal by the light receiving part 32 drives the drive wheels 23 and 23 (motors 24 and 24) by the control part 37 and travels for a predetermined distance toward the charging device 12. Thus, the electric vacuum cleaner main body 11 is made to gradually approach the charging device 12 by repetition of transmission and receiving between the light receiving part 32, the light emitting part 33 of the electric vacuum cleaner main body 11 and the charging device light emitting part 55, the charging device light receiving part 56 of the charging device 12, and in the state where the electric vacuum cleaner main body 11 has moved (returned) to the charging device 12, the charging terminals 45 are (mechanically and electrically) connected to the terminals for charging 53, and the respective parts are stopped and the cleaning operation is ended.

(Charging Operation)

After the electric vacuum cleaner main body 11 is connected to the charging device 12, at a predetermined timing, for example, when a charging start time set in advance begins, or when a predetermined time elapses after the connection of the electric vacuum cleaner main body 11 to the charging device 12, the control part 37 and the charging device control part 58 shift to the charging mode, respectively, and drive the charging circuit 52 to start charging of the secondary battery 39. Then, when it is judged that the voltage of the secondary battery 39 has risen to a predetermined usable voltage, the control part 37 and the charging device control part 58 stop charging by the charging circuit 52 and end the charging operation, and the control part 37 and the charging device control part 58 shift to the standby mode, respectively.

(Imaging Operation)

The control part 37 judges, for example, in real time or at each predetermined time whether an imaging command signal that is an external signal transmitted from an external device via the network 15 and commanding imaging with the camera 35 has been received by the wireless LAN device 36 via the access point 14 (Step 1). In wireless communication between an external device and the electric vacuum cleaner main body 11, it is preferable to present these from receiving invalid signals by requesting authentication at the time of connection by, for example, setting an ID and a password, etc., for each external device and each electric vacuum cleaner main body 11.

In this Step 1, when judging that an imaging command signal that is an external signal transmitted from an external device via the network 15 and commanding imaging with the camera 35 has been received by the wireless LAN device 36, first, the control part 37 detects the remaining capacity of the secondary battery 39 regardless of its mode, and judges whether the remaining capacity of the secondary battery 39 is an imaging enabling capacity that enables imaging with the camera 35 (Step 2). Hereinafter, the imaging enabling capacity means a capacity that enables reciprocating movement to and back from, for example, a predetermined imaging position at which imaging of an object P is performed, and enables imaging with the camera 35 and transmission of imaged image data from the network 15 to the external device via the wireless LAN device 36.

Then, in Step 2, when judging that the remaining capacity of the secondary battery 39 is not the imaging enabling capacity, the control part 37 informs, for example, the external device that imaging is impossible by using the wireless LAN device 36 (Step 3), and disregards the imaging command signal and returns the process to Step 1.

On the other hand, in Step 2, when judging that the remaining capacity of the secondary battery 39 is not less than the imaging enabling capacity, the control part 37 (and the charging device control part 58) judges the mode (Step 4).

In this step 4, when judging that the mode is the charging mode or standby mode, the control part 37 drives the drive wheels 23 and 23 (motors 24 and 24) and separates the electric vacuum cleaner main body 11 by, for example, a predetermined distance (for example, 30 cm or more) from the charging device (Step 5), and shifts to the imaging mode (Step 6).

On the other hand, in Step 4, when judging that the mode is the cleaning mode, the control part 37 stops driving of, for example, the electric blower 21, the side brushes 26 and 26 (side brush motors 27 and 27), and the rotary brush 28 (brush motor 29) to interrupt cleaning (Step 7), and advances the process to Step 6 and shifts to the imaging mode.

Then, in the imaging mode in Step 6, first, a signal informing that the mode is the imaging mode is transmitted from the light emitting part 33 of the electric vacuum cleaner main body 11 to the charging device 12 (Step 8). In the charging device 12, when it receives the signal informing that the mode is the imaging mode from the electric vacuum cleaner main body 11, the charging device control part 58 shifts to the imaging mode and outputs guide signals SL and SR from the charging device left light emitting part 55L and the charging device right light emitting part 55R of the charging device light emitting part 55, and outputs a predetermined collision prevention signal SS from the charging device sending part 57. In the present embodiment, guide signals SL and SR are output from the charging device left light emitting part 55L and the charging device right light emitting part 55R of the charging device light emitting part 55, respectively, in, for example, a direction crossing the front direction of the object P (up-down direction of FIG. 1). In other words, the direction in which the electric vacuum cleaner main body 11 is guided toward the charging device 12 by the guide signals SL and SR is the direction crossing (orthogonal to) the direction toward the object P. These guide signals SL and SR can be distinguished at the electric vacuum cleaner main body 11 side by making codes of these signals different from each other or outputting signals with the same code in a time-division manner. Therefore, after Step 8, the control part 37 judges whether there is a response from the charging device 12 side (Step 9), and when there is no response for a predetermined time, the control part 37 drives the drive wheels 23 and 23 (motors 24 and 24) to make the electric vacuum cleaner main body 11 (main body case 20) travel (Step 10), and returns the process to Step 8. This control in Step 10 is on the assumption that no response from the charging device 12 side in Step 9 is caused by a state where a signal from the electric vacuum cleaner main body 11 has not been received by the charging device 12 or the electric vacuum cleaner main body 11 is at a position at which it cannot receive a response from the charging device 12, and is performed for searching for a position of the electric vacuum cleaner main body 11 from which a signal can be received by the charging device 12 or a position at which the electric vacuum cleaner main body 11 can receive a signal from the charging device 12 by making the electric vacuum cleaner main body 11 (main body case 20) move about inside the room R. Therefore, in this Step 10, the electric vacuum cleaner main body 11 (main body case 20) can find a position at which it can communicate with the charging device 12 by being made, for example, to turn at a current position, randomly travel, and travel around a circle with a predetermined radius.

On the other hand, in Step 9, when judging that there is a response from the charging device 12 side, the control part 37 drives the drive wheels 23 and 23 (motors 24 and 24) to make the electric vacuum cleaner main body 11 (main body case 20) travel for a predetermined distance toward the charging device 12 according to the guide signals SL and SR (Step 11).

Figure 5:
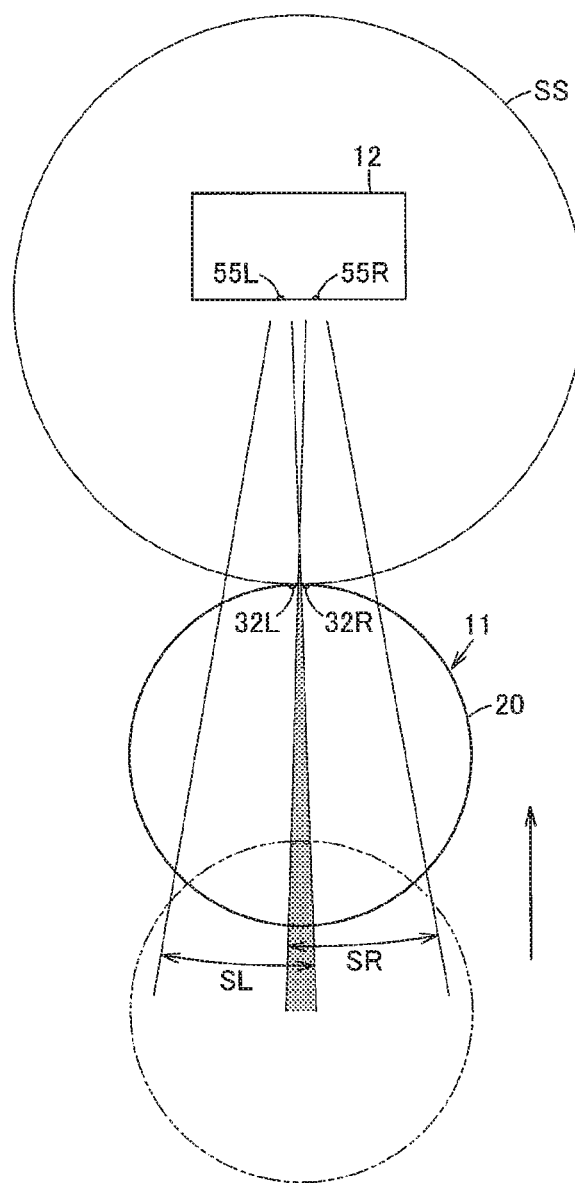
FIG. 5 is a plan view schematically showing a principle of guidance of the autonomously traveling body by the same beacon device.

At this time, as shown in FIG. 5, for example, the guide signals SL and SR are output radially (prolate elliptically) to a region at the left of the front of the charging device 12 from the charging device left light emitting part 55L and radially (prolate elliptically) to a region at the right of the front of the charging device 12 from the charging device right light emitting part 55R, respectively. In detail, driving of the drive wheels 23 and 23 (motors 24 and 24) is controlled so that, for example, the electric vacuum cleaner main body 11 (main body case 20) travels relatively leftward when it receives only the guide signal SL first by the left light receiving part 32L of the light receiving part 32, and travels relatively rightward when it receives only the guide signal SR first by the right light receiving part 32R of the light receiving part 32. By controlling driving of the drive wheels 23 and 23 (motors 24 and 24) so that the electric vacuum cleaner main body 11 (main body case 20) travels at a position at which it receives the guide signal SL by the left light receiving part 32L and receives the guide signals SL and SR by the right light receiving part 32R, the electric vacuum cleaner main body 11 can travel linearly along a region (a width of, for example, approximately 10 to 20 cm) in which the guide signals SL and SR overlap each other toward the charging device 12.

Next, based on whether or not the sensor part 31 has received a collision prevention signal SS, the control part 37 judges whether the electric vacuum cleaner main body 11 has reached a position at a predetermined distance from the charging device 12 (Step 12). Here, the collision prevention signal SS is output into, for example, a circle with a predetermined radius (for example, 30 cm) around the charging device 12, and set so as to prevent the electric vacuum cleaner main body 11 from entering the inside of this radius. In this Step 12, when judging that the electric vacuum cleaner main body 11 has not reached the position at the predetermined distance from the charging device 12, the control part 37 returns the process to Step 9. In this Step 12, when judging that the electric vacuum cleaner main body 11 has reached the position at the predetermined distance from the charging device 12, the control part 37 stops traveling at the current position (Step 13), turns the main body case 20 at a predetermined angle (for example, 90 degrees) together with the camera 35 toward a direction indicated by the direction indicating part 59, that is, toward the object P by controlling driving of the drive wheels 23 and 23 (motors 24 and 24), and as shown in FIG. 1, turns the camera 35 that was disposed on the front portion of the main body case 20 and directed toward the charging device 12 toward the object P and images a still image, and stores this image data in the memory and transmits it to the external device by the wireless LAN device 36 via the network 15 (Step 14). That is, by installing the charging device 12 so that the direction to be indicated by the direction indicating part 59 is directed toward the object P, the object P is imaged when the camera 35 performs imaging in this indicated direction. The turning angle of the main body case 20 is determined by the control part 37 based on a difference in the number of rotations between the left and right motors 24 and 24 detected by the sensor part 31.

Then, when imaging is finished, the control part 37 transmits an imaging end signal for requesting ending of the imaging mode from the light emitting part 33 (Step 15). When the charging device light receiving part 56 of the charging device 12 receives this imaging end signal, the charging device control part 58 stops output of the collision prevention signal SS from the charging device sending part 57 (Step 16). In addition, the control part 37 judges the mode just before shifting to the imaging mode (Step 17).

In this Step 17, when judging that the mode was the charging mode or standby mode, the control part 37 makes the electric vacuum cleaner main body 11 return to the charging device 12 in the same manner as in the cleaning operation, and shifts to the charging mode together with the charging device control part 58 (Step 18).

On the other hand, in Step 17, when judging that the mode was the cleaning mode (the cleaning mode was interrupted and shifted to the imaging mode), the control part 37 judges whether the capacity of the secondary battery 39 is enough by comparing it with a capacity required for the remaining cleaning (Step 19), and when judging that the capacity is enough, the control part 37 drives the electric blower 21, the side brushes 26 and 26 (side brush motors 27 and 27), and the rotary brush 28 (brush motor 29) to return to cleaning (Step 20), and when judging that the capacity is not enough, the control part 37 advances the process to Step 18 and makes the electric vacuum cleaner main body 11 return to the charging device 12 in the same manner as in the cleaning operation and shifts to the charging mode. It is also possible that the control part 37 performs control so as to shift to the charging mode always in the case where the imaging mode is ended regardless of the mode just before shifting to the imaging mode. In this case, after charging of the secondary battery 39 is finished, for example, the control part 37 may directly shift to the standby mode, or after this charging, only in the case where the mode just before shifting to the imaging mode was the cleaning mode, the control part 37 may return to cleaning.

That is, simply guiding the electric vacuum cleaner main body to a predetermined position near the object by the guide signals from the charging device results in imaging of the charging device with the camera equipped on the front portion of the main body case of the electric vacuum cleaner main body. Therefore, it is considered that the charging device is disposed in front of the object, etc., so that the object is imaged together with the charging device, however, in this case, imaging of the object is also obstructed by the charging device reflected in the taken image. Therefore, in the first embodiment described above, when the main body case 20 (electric vacuum cleaner main body 11) reaches a position at a predetermined distance from the charging device 12 in the imaging mode, the camera 35 is turned at a predetermined angle together with the main body case 20 toward a set direction that is to be directed toward the object P set in advance in the charging device 12, that is, in the present embodiment, a direction indicated by the direction indicating part 59, and accordingly, the camera 35 can be directed toward the object P positioned in the indicated direction, so that only the object P can be reliably imaged with the camera 35 while the electric vacuum cleaner main body 11 is reliably guided to the predetermined position (imaging position) without imaging the charging device 12 that guides the electric vacuum cleaner main body 11.

Figure 7:
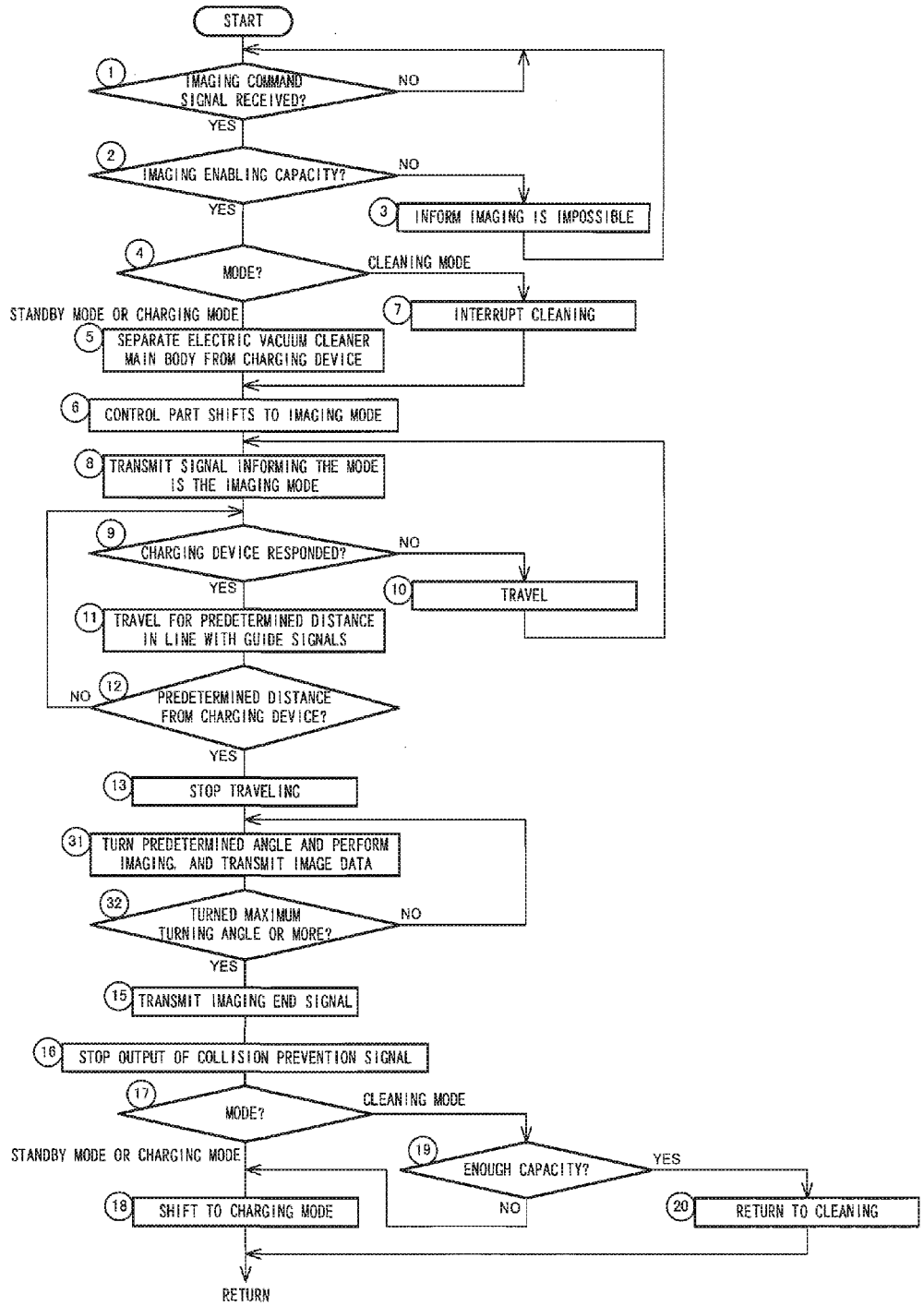
FIG. 7 is a flowchart showing a portion of control of a traveling body device according to a second embodiment.

Next, a second embodiment is described with reference to FIG. 7. The same constitutions and operations as in the first embodiment described above are designated by the same reference symbols, and description thereof is omitted.

In this second embodiment, in the imaging mode of the first embodiment described above, imaging is performed with the camera 35 while the direction toward which the camera 35 is directed is turned in increments of a predetermined angle.

That is, after Step 13, the control part 37 images a still image with the camera 35 by turning the main body case 20 at a predetermined angle together with the camera 35 by controlling driving of the drive wheels 23 and 23 (motors 24 and 24), stores this image data in the memory, and transmits the image data to the external device by the wireless LAN device 36 via the network 15 (Step 31). Next, the control part 37 judges whether the main body case 20 (camera 35) has turned a predetermined maximum turning angle, for example, 360 degrees or more (Step 32). In this Step 32, when judging that the main body case 20 has turned a maximum turning angle or more, the control part 37 advances the process to Step 15, and when judging that the main body case 20 has not turned a predetermined maximum turning angle or more, the control part 37 returns the process to Step 31. Instead of transmission of the image data imaged with the camera 35 to the external device each time of imaging, the image data may be transmitted to the external device collectively after all imaging is finished.

Thus, according to the second embodiment described above, by performing imaging while turning the camera 35 in increments of a predetermined angle together with the main body case 20 in the imaging mode, not only the object P but also the conditions inside the room R around the object P can be imaged with the camera 35. As a result, images of the object P imaged from different angles can be obtained, and not only the condition of the object P but also, for example, the conditions in the user's home while the user is out (for example, whether windows are left open and lights are left turned on, etc.) can also be monitored and confirmed.

In the embodiments described above, the camera 35 is turned together with the main body case 20, however, it is also possible that, for example, the camera 35 is provided turnably separately from the main body case 20, and only the camera 35 is turned. In this case, it is preferable that a direction detection unit (direction detecting part), etc., that detects the direction of the camera 35 is provided so as to enable the control part 37 to monitor the direction of the camera 35.

The predetermined angle to turn the camera 35 may be changed according to an external signal corresponding to an input operation performed by a user from an external device when the control part 37 receives the external signal from the wireless LAN device 36 in the imaging mode. In this case, a position regarded by the user as necessary can be reliably imaged with the camera 35, so that the convenience is further improved.

According to at least one of the embodiments described above, an image reliably capturing the object P can be obtained while the electric vacuum cleaner main body 11 is reliably guided to the predetermined position by the charging device 12.

In addition, in the imaging mode, the control part 37 directs the camera 35 toward the set direction (direction indicated by the direction indicating part 59) by turning the electric vacuum cleaner main body 11 (main body case 20), so that the drive wheels 23 and 23 (motors 24 and 24) for enabling the main body case 20 to travel can be used as they are for changing the direction of the camera 35, so that separate constitutions and controls for changing the direction of the camera 35 are not necessary, and the electric vacuum cleaner 11 can be further simplified in constitution and control.

Figure 8:
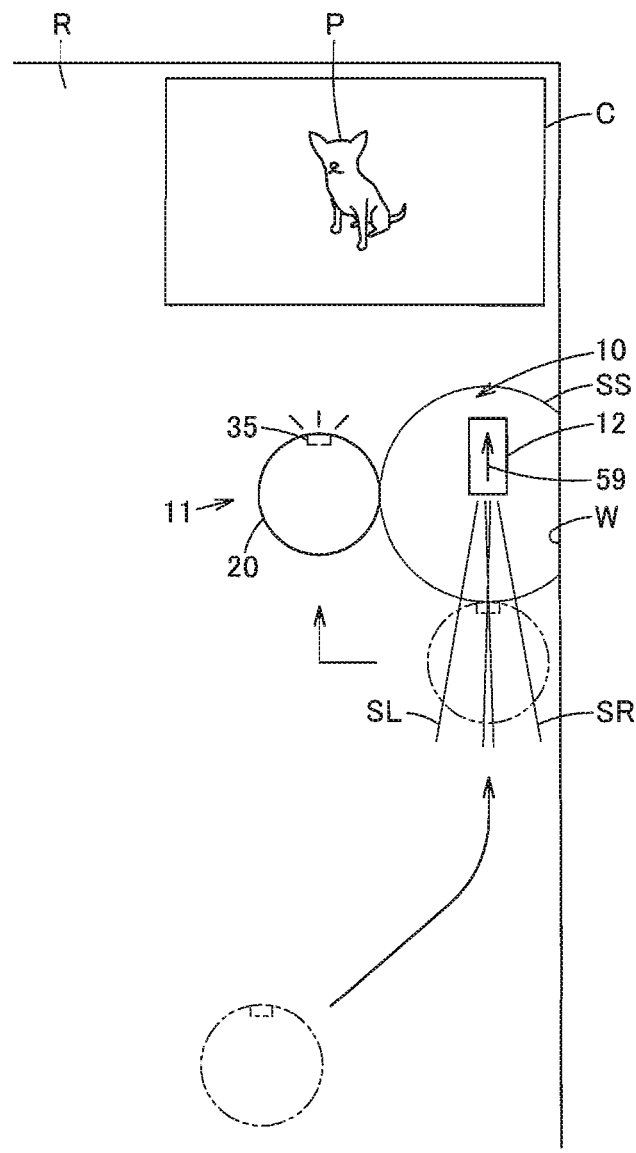
FIG. 8 is a plan view schematically showing movement of an autonomously traveling body of a traveling body device according to a third embodiment.
Figure 9:
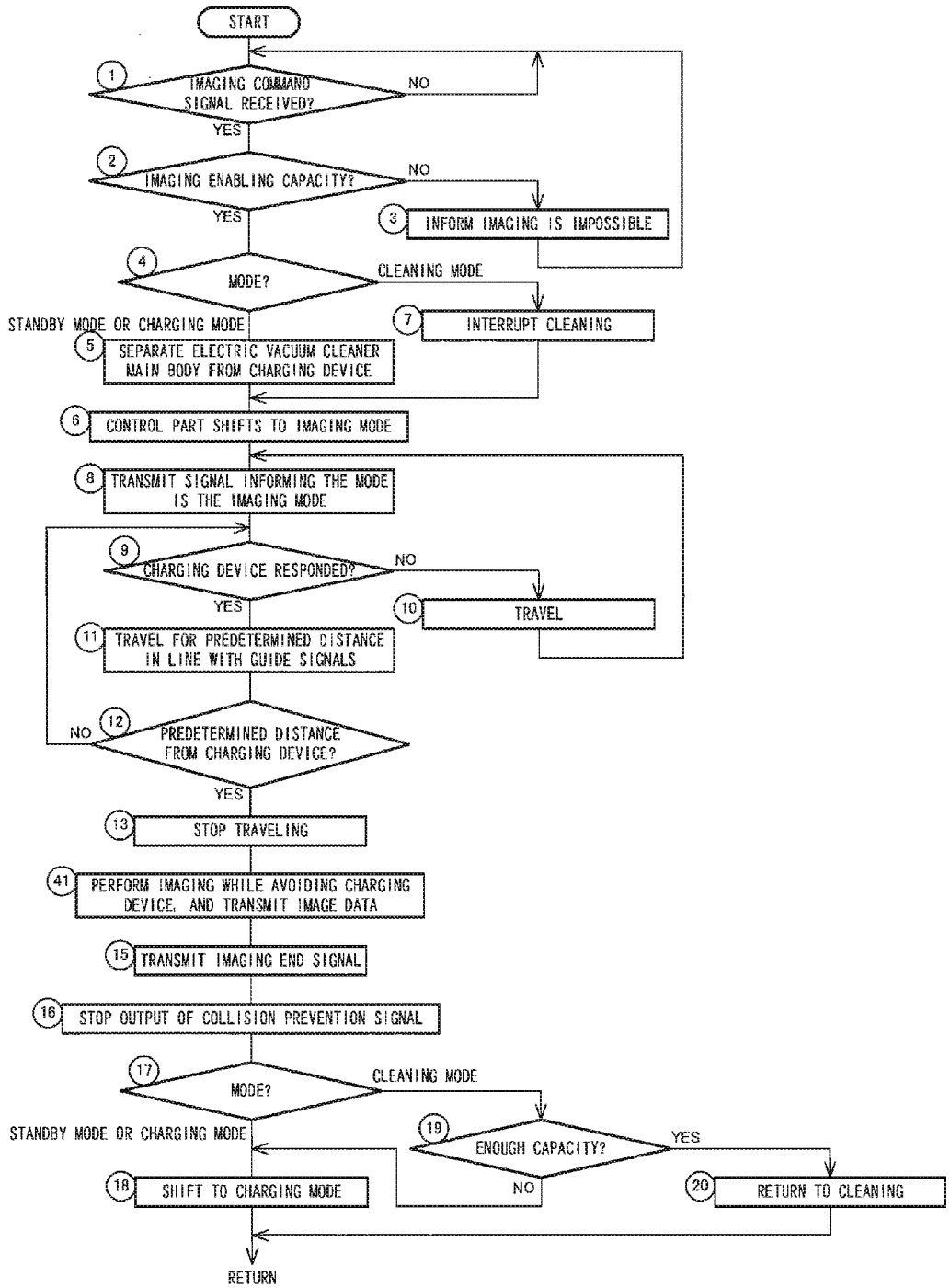
FIG. 9 is a flowchart showing a portion of control of the same traveling body device.
Figure 10:
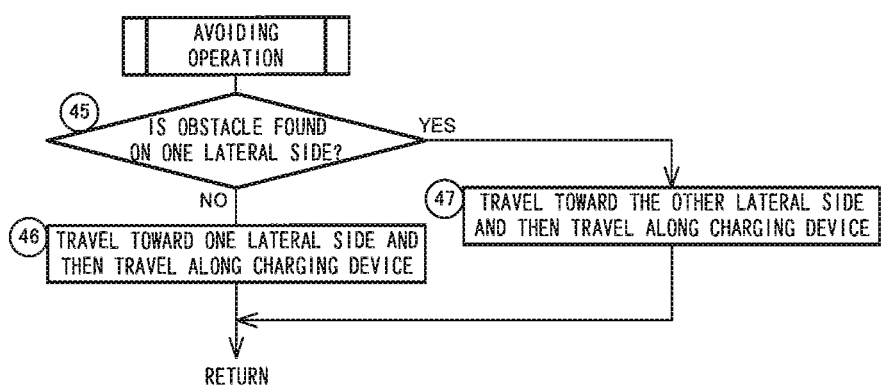
FIG. 10 is a flowchart showing control of a charging device avoiding operation to be performed by the autonomously traveling body of the same traveling body device.

Next, a third embodiment is described with reference to FIG. 8 to FIG. 10. The same constitutions and operations as in the embodiments described above are designated by the same reference symbols, and description thereof is omitted.

According to this third embodiment, in the first embodiment described above, in the case where guide signals SL and SR are output from the charging device left light emitting part 55L and the charging device right light emitting part 55R of the charging device light emitting part 55 of the charging device 12, respectively, along, for example, the front direction of the object P (up-down direction in FIG. 8), and imaging is performed with the camera 35 in the imaging mode, instead of the control to turn the main body case 20, the control part 37 directs the camera 35 toward the object P by making the electric vacuum cleaner main body 11 (main body case 20) travel in a set direction that is to be directed toward the object P (direction indicated by the direction indicating part 59) set in advance in the charging device 12 while avoiding the charging device 12.

That is, in the present embodiment, the direction in which guide signals SL and SR are transmitted from the charging device light emitting part 55 (the respective light emitting parts 55L and 55R) is opposite (180 degrees) to the direction indicated by the direction indicating part 59. Therefore, in the present embodiment, instead of Step 14 of the first embodiment described above, the electric vacuum cleaner main body 11 directs the camera 35 disposed on the front portion of the main body case 20 toward the object P by traveling in the set direction along the charging device 12 while avoiding the charging device 12, images a still image with the camera 35, stores this image data in the memory, and transmits the image data to the external device by the wireless LAN device 36 via the network 15 (Step 41).

As an operation of the electric vacuum cleaner main body 11 to avoid the charging device 12 at this time, for example, the electric vacuum cleaner main body 11 detects whether there is an obstacle on one lateral side (for example, the left side in FIG. 8) of the charging device 12 by the sensor part 31 (Step 45), and when judging that there is no obstacle, the control part 37 controls driving of the drive wheels 23 and 23 (motors 24 and 24) and makes the electric vacuum cleaner main body 11 (main body case 20) travel for a predetermined distance toward the one lateral side of the charging device 12 and then travel in the set direction along the charging device 12 (Step 46). On the other hand, in Step 45, when judging that there is an obstacle on the one lateral side of the charging device 12, the control part 37 controls driving of the drive wheels 23 and 23 (motors 24 and 24) and makes the electric vacuum cleaner main body 11 (main body case 20) travel for a predetermined distance toward the other lateral side (for example, the right side in FIG. 8) of the charging device 12 and then travel in the set direction along the charging device 12 (Step 47). That is, the electric vacuum cleaner main body 11 (main body case 20) approaches the object P while avoiding the charging device 12 by traveling along a cranked (L-shaped) route. This is, as shown in FIG. 8, an avoiding operation on the assumption that the charging device 12 is generally disposed near the wall portion W of the room R.

Thus, according to the third embodiment described above, in the imaging mode, when the main body case 20 (electric vacuum cleaner main body 11) reaches a position at a predetermined distance from the charging device 12, by making the main body case 20 (electric vacuum cleaner main body 11) travel in the set direction while avoiding the charging device 12, the camera 35 can be directed toward the object P, so that while the electric vacuum cleaner main body 11 is reliably guided to a predetermined position (imaging position), only the object P can be reliably imaged with the camera 35 without imaging the charging device 12 that has guided the electric vacuum cleaner main body 11.

In particular, in the imaging mode, when the main body case 20 (electric vacuum cleaner main body 11) reaches a position at a predetermined distance from the charging device 12, in the case where the sensor part 31 detects no obstacle (wall portion W) on one lateral side of the charging device 12, the control part 37 makes the main body case 20 (electric vacuum cleaner main body 11) travel toward the one lateral side of the charging device 12 and then travel in the set direction along the charging device 12, and in the case where the sensor part 31 detects an obstacle (wall portion W) on the one lateral side of the charging device 12, the control part 37 makes the main body case 20 (electric vacuum cleaner main body 11) travel toward the other lateral side of the charging device 12 and then travel in the set direction along the charging device 12, so that without requiring complicated controls, the charging device 12 can be easily and reliably avoided and the camera 35 can be reliably directed toward the object P.

In addition, the electric vacuum cleaner main body 11 capable of autonomously traveling generally includes the sensor part 31 for autonomously traveling while avoiding obstacles, so that by utilizing this sensor part 31, the operation to avoid the charging device 12 can be easily performed without making the constitution complicated.

The third embodiment described above may be combined with the first embodiment or second embodiment described above. That is, the operation of the electric vacuum cleaner main body 11 to direct the camera 35 toward the object P may be changed according to the output direction of the guide signals SL and SR from the charging device 12.

In the embodiments described above, the charging device 12 is provided with the function of a beacon device for guiding the electric vacuum cleaner main body 11 (autonomously traveling body) to a predetermined position, however, a beacon device may be provided separately from the charging device 12.

According to at least one of the embodiments described above, by making the main body case 20 (electric vacuum cleaner main body 11) travel so as to approach the charging device 12 in line with the guide signals SL and SR received by the light receiving part 32 (light receiving parts 32L and 32R), and performing imaging in the set direction (direction indicated by the direction indicating part 59) with the camera 35 when the main body case 20 (electric vacuum cleaner main body 11) reaches a position at a predetermined distance from the charging device 12, while the electric vacuum cleaner main body 11 is reliably guided to the predetermined position (imaging position) only the object P positioned in the set direction can be reliably imaged with the camera 35 without imaging the charging device 12 that has guided the electric vacuum cleaner main body 11. Then, by transmitting the image data to an external device, a convenient electric cleaning device 10 with which the condition of the object P inside the room can be easily and reliably monitored from the outside by using the external device can be provided.

Figure 11A:
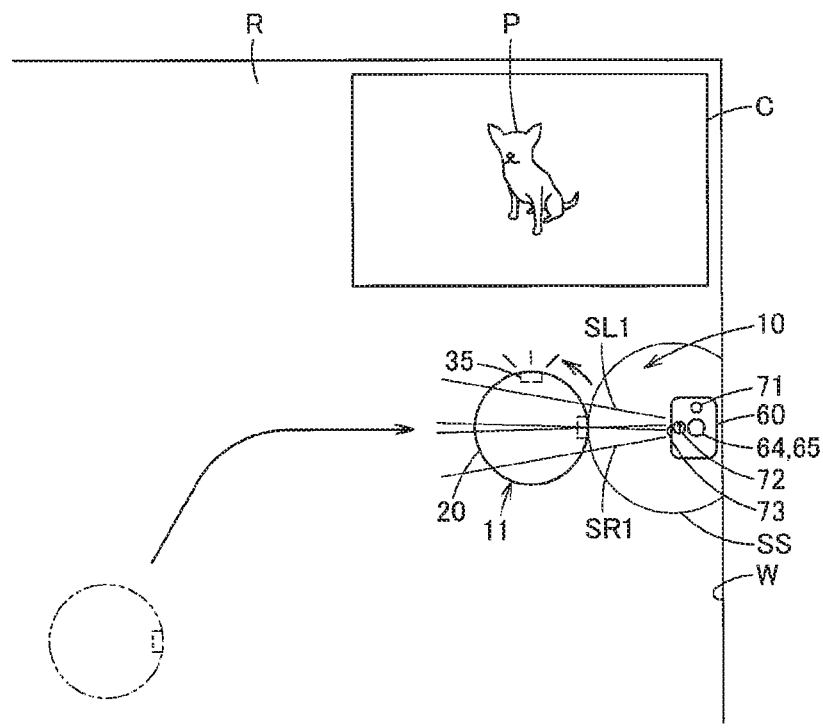
FIG. 11A is a plan view schematically showing movements of an autonomously traveling body in a case where an indicating part of a traveling body device according to a fourth embodiment indicates one direction.
Figure 15:
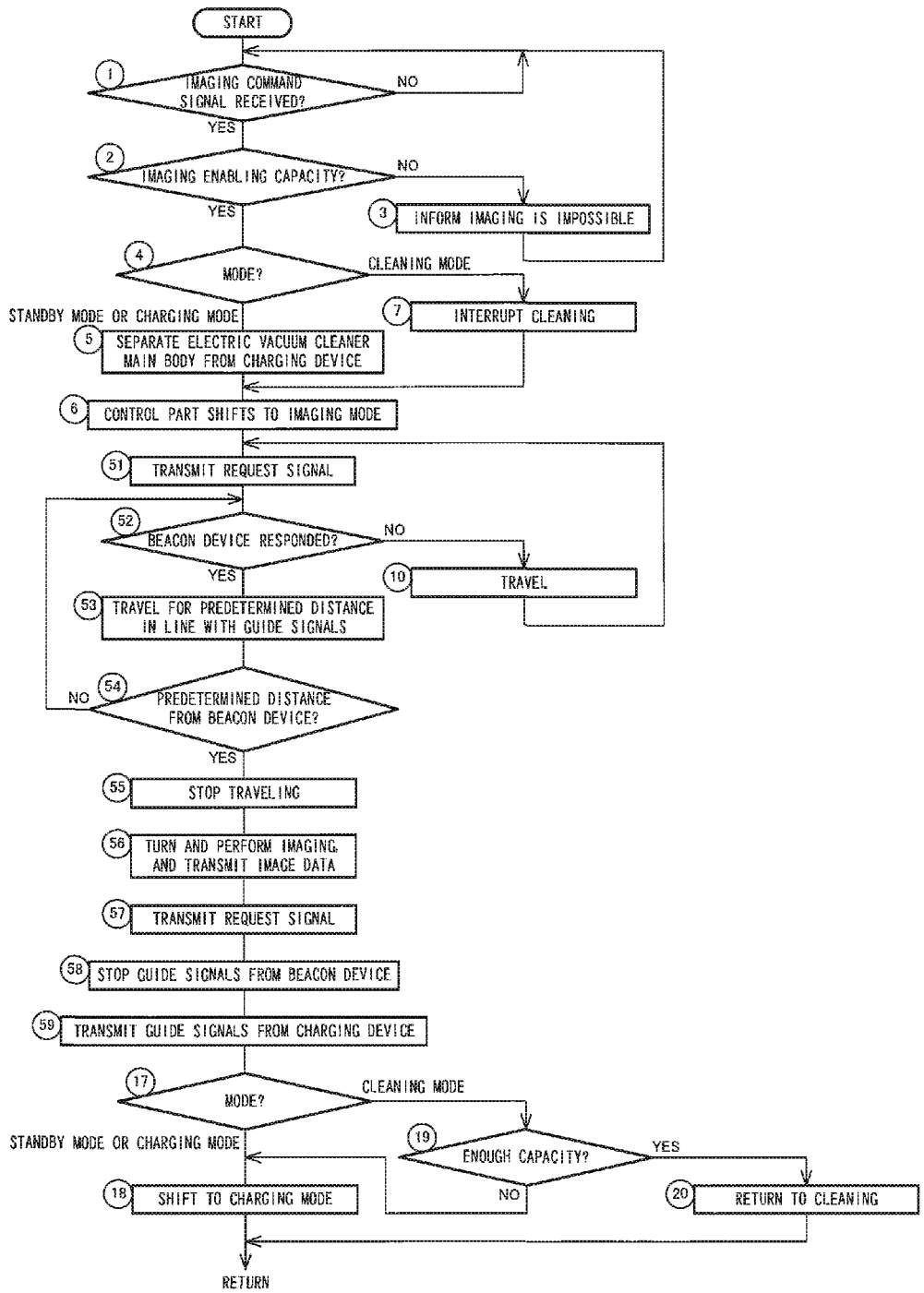
FIG. 15 is a flowchart showing a portion of control of the same traveling body device.

Next, a fourth embodiment is described with reference to FIG. 11A, to FIG. 15. The same constitutions and operations as in the embodiments described above are designated by the same reference symbols, and description thereof is omitted.

According to this fourth embodiment, the electric cleaning device 10 according to the first embodiment includes a charging device (charging base) 12 that serves as a base part for charging the electric vacuum cleaner main body 11 and a beacon device 60 that guides the electric vacuum cleaner main body 11. That is, in the present embodiment, the charging function of the charging device 12 and the function to guide the electric vacuum cleaner main body 11 to an imaging position according to the embodiments described above are separated from each other, and basically, the charging device 12 performs only charging of the secondary battery 39, and guidance of the electric vacuum cleaner main body 11 to an imaging position is performed by the beacon device 60.

The collision prevention detection unit (collision prevention sensor) of the sensor part 31 is for preventing collisions with the charging device 12 and the beacon device 60, etc.

The light receiving part 2 and the light emitting part 33 are constituted to receive signals from and transmit signals to not only the charging device 12 but also the beacon device 60.

The imaging mode of the control part 37 is set so that it performs imaging with the camera 35 according to guidance of the beacon device 60.

The charging device control part 58 of the charging device 12 has a charging mode for charging the secondary battery 39 via the charging circuit 52, and a standby mode while waiting for operation.

The beacon device 60 includes a beacon device case 61, a battery for power supply (not shown), a beacon device light emitting part 63 being a beacon device transmitting unit (beacon device transmitting part) as a transmitting unit (transmitting part) that outputs various signals such as positional information of the beacon device 60 by using, for example, infrared rays, etc., a beacon device light receiving part 64 being a beacon device receiving unit (beacon device receiving part) that receives light emitted from the light emitting part 33 of the electric vacuum cleaner main body 11, a beacon device sending part 65 being a beacon device sending-out unit (beacon device sending-out part) that outputs a collision prevention signal to the surrounding area of the charging device 12 by using, for example, infrared rays, etc., and a beacon device control part 66 as a beacon device control unit that controls operations of the beacon device light emitting part 63, the beacon device light receiving part 64, and the beacon device sending part 65, etc., and so on.

The beacon device case 61 is formed into, for example, a hollow rectangular parallelepiped, and disposed at a position that does not obstruct cleaning, such as the vicinity of a wall portion W that partitions the room R. On the substantially central portion of the upper portion of this beacon device case 61, the beacon device light receiving part 64 and the beacon device sending part 65 are disposed, and near this beacon device sending part 65, a power supply switch 71 for starting and stopping and an indicating part 72 as an indicating unit are disposed. On a side surface portion of the beacon device case 61, the beacon device light emitting part 63 and a display part 73 as a display unit are disposed.

The indicating part 72 indicates a direction that is directed toward the object P when the beacon device 60 is disposed in the room R, and is, for example, a dial-type direction indicating switch provided rotatably, and includes, on the upper portion, a direction indicating part 72a such as an arrow that shows a front direction of the beacon device 60, in other words, the direction toward the object P. This indicating part 72 can variably set the direction (orientation) of the direction indicating part 72a according to an operation, and is, in the present embodiment, rotatable, for example, 180 degrees, and fixed at positions in mutually different two directions that are one direction crossing (orthogonal to) the transmission direction of guide signals from the beacon device light emitting part 63 and the other direction being the opposite direction, and the switch switches to on and off between one or the other of these positions.

The display part 73 is an icon (mark) provided on a portion of the side surface portion of the beacon device case 61 on the same side as that of the beacon device light emitting part 63, and displays a direction of signals to be emitted from the beacon device light emitting part 63, that is, a predetermined direction. That is, in the beacon device 60, a user can recognize that the signals are transmitted by the beacon device light emitting part 63 from the side on which the display part 73 is positioned.

The user installs the beacon device 60 in the room R by rotating the indicating part 72 so that the direction indicated by the indicating part 72 (direction indicating part 72a) is directed toward the object P as viewed from this beacon device 60 while disposing the beacon device 60 so that the side on which the display part 73 is disposed faces the inside of the room R.

The battery is electrically connected to the beacon device light emitting part 63, the beacon device light receiving part 64, the beacon device sending part 65, and the beacon device control part 66 so as to supply power to these. This battery may be a rechargeable secondary battery or a primary battery.

The beacon device light emitting part 63 emits light such as infrared rays to the electric vacuum cleaner main body 11 in a direction having a predetermined relationship (a predetermined angle) with the direction indicated by the indicating part 72, that is, in the present, embodiment, in a direction crossing at 90 degrees the direction indicated by the indicating part 72, and for example, at positions separated from each other on the central portion of the side portion of the beacon device case 61, the beacon device left light emitting part 63L and the beacon device right light emitting part 63R are disposed. This beacon device light emitting part 63 emits light when a signal (light) from the light emitting part 33 of the electric vacuum cleaner main body 11 is received by the beacon device light receiving part 64.

The beacon device light receiving part 64 is for grasping the positional relationship between the electric vacuum cleaner main body 11 and the beacon device 60 by detecting infrared rays, etc., emitted from the light emitting part 33 of the electric vacuum cleaner main body 11, and is disposed on, for example, the upper portion of the beacon device case 61.

The beacon device sending part 65 outputs a collision prevention signal to, for example, a position with a predetermined radius (for example, approximately 30 cm) around the beacon device 60 to prevent the electric vacuum cleaner main body 11 from getting any closer to the beacon device 60, and is disposed on, for example, the central portion, etc., of the upper portion of the beacon device case 61.

The beacon device control part 66, for example, generates infrared signals to be emitted from the beacon device light emitting part 63 according to a direction indicated by the indicating part 72, and processes infrared signals that were emitted from the light emitting part 33 of the electric vacuum cleaner main body 11 and received by the beacon device light receiving part 64. In particular, as guide signals SL and SR to be transmitted from the beacon device light emitting part 63, this beacon device control part 66 can selectively generate guide signals SL1 and SR1 or guide signals SL2 and SR2 according to a direction indicated by the indicating part 72, and the guide signal SL1 and the guide signal SL2 have codes different from each other, and the guide signal SR1 and the guide signal SR2 have codes different from each other. In the present embodiment, when the indicating part 72 (direction indicating part 72a) is directed toward the right side with respect to the transmission direction of the guide signals from the beacon device light emitting part 63 (the left side as viewed from the electric vacuum cleaner main body 11 that receives the guide signals), the beacon device control part 66 generates guide signals SL1 and SR1, and when the indicating part 72 (direction indicating part 72a) is directed toward the left side with respect to the transmission direction of the guide signals from the beacon device light emitting part 63 (the right side as viewed from the electric vacuum cleaner main body 11 receives the guide signals), the beacon device control part 66 generates guide signals SL2 and SR2. This beacon device control part 66 has an imaging mode in which the beacon device control part 66 guides the electric vacuum cleaner main body 11 to a position at which it can perform imaging with the camera 35, and a standby mode in which, for example, the beacon device control part 66 sends only a collision prevention signal from the beacon device sending part 65.

Next, operation of a fourth embodiment is described with reference to the flowchart shown in FIG. 15 as well. The same operations as in the steps of the embodiments described above are designated by the same step numbers, and description thereof is omitted.

The electric vacuum cleaner main body 11 according to the present embodiment performs an imaging operation to image an object P (for example, a pet such as a dog in a cage C) according to guidance given by the beacon device 60 in addition to the cleaning operation to perform cleaning by the electric vacuum cleaner main body 11 and the charging operation to charge the secondary battery 39 by the charging device 12. The cleaning operation and the charging operation are the same as in the embodiments described above, so that only the imaging operation is described.

(Imaging Operation)

Figure 11B:
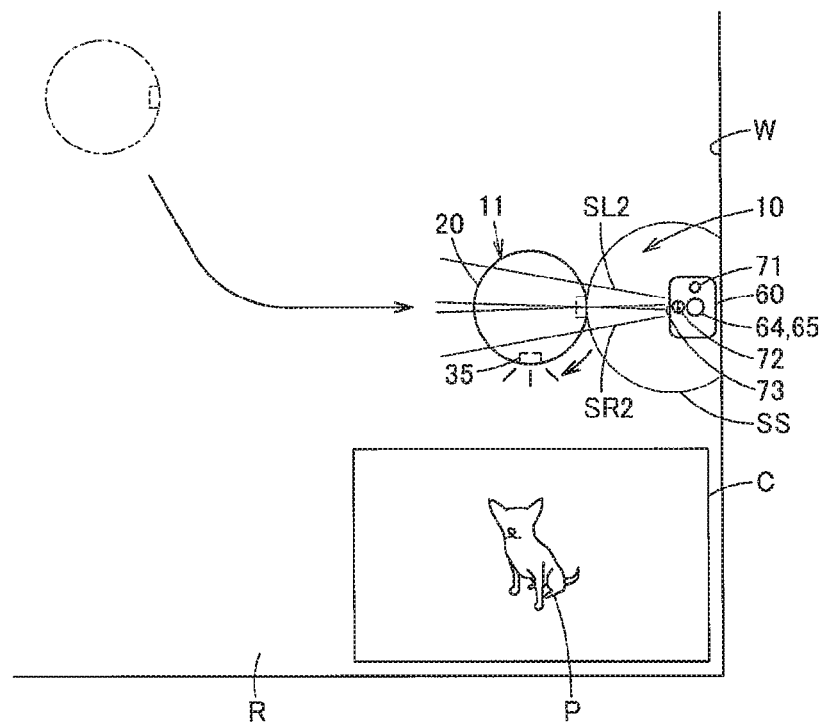
FIG. 11B is a plan view schematically showing movements of the autonomously traveling body in a case where the indicating part indicates the other direction.
Figure 12A:
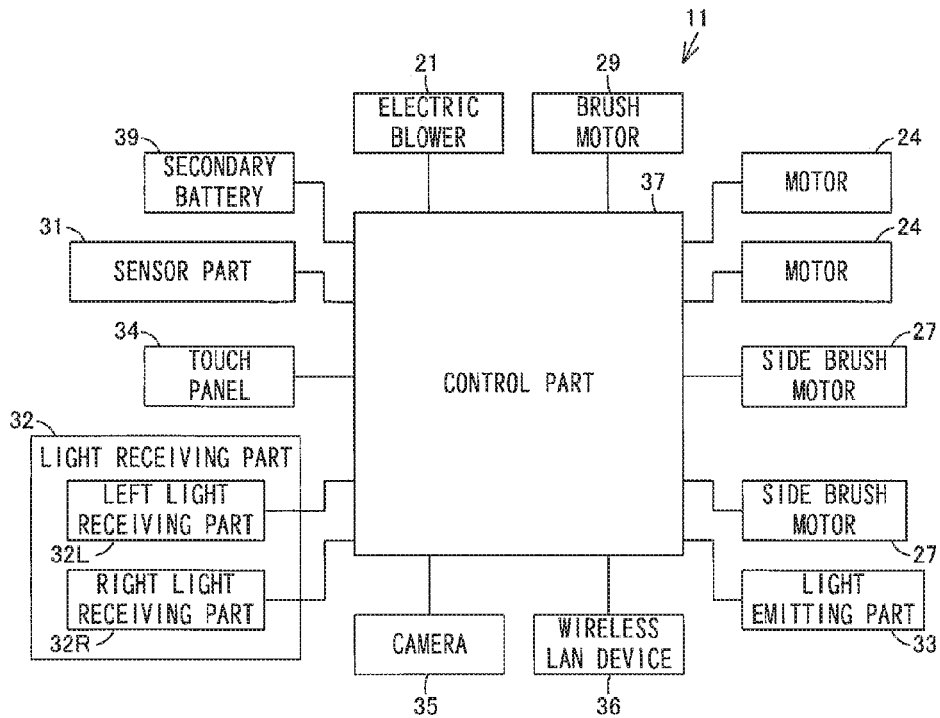
FIG. 12A is a block diagram showing an internal structure of the autonomously traveling body of the same traveling body device.
Figure 12B:
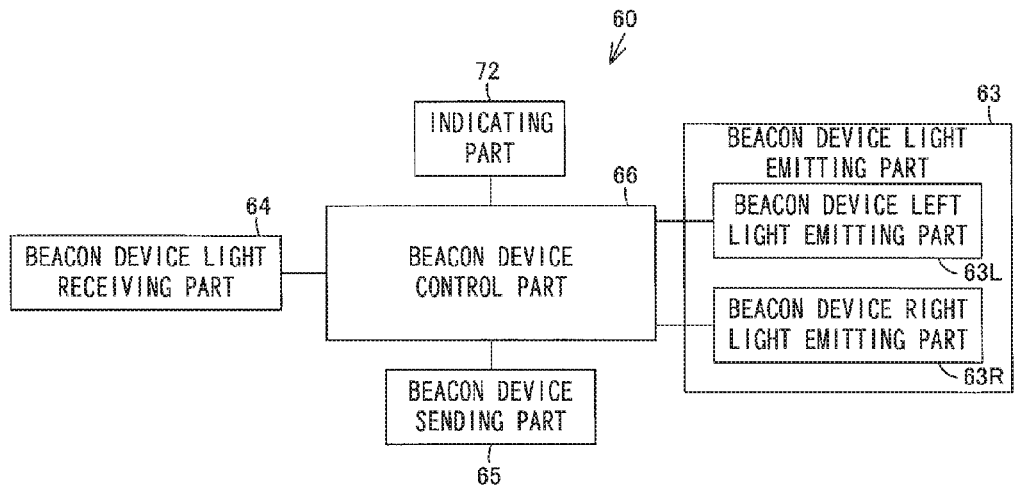
FIG. 12B is a block diagram showing an internal structure of a beacon device of the same traveling body device.
Figure 13:
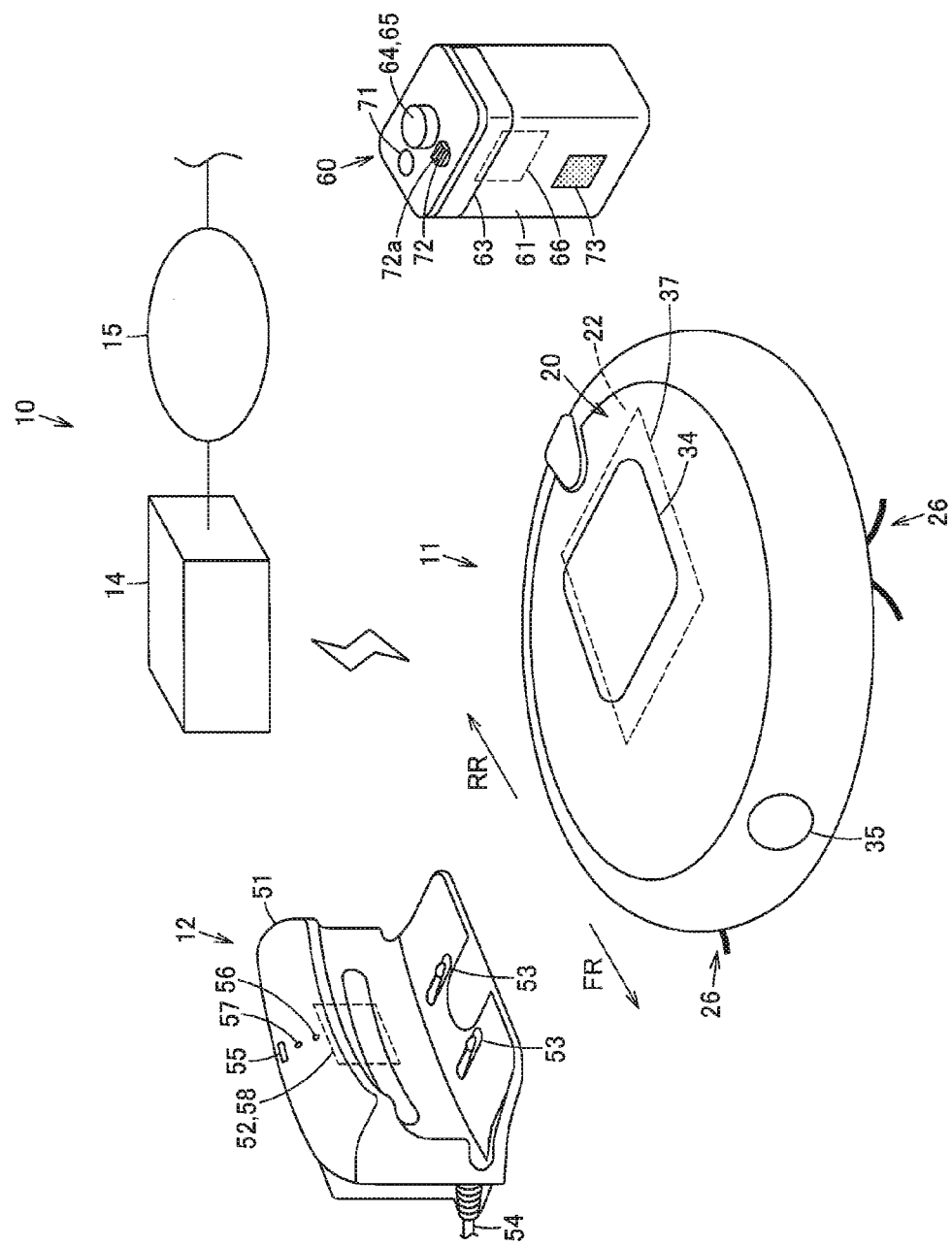
FIG. 13 is a perspective view showing the same traveling body device.

After the controls of Steps 1 to 7, a request signal for requesting guidance of a position in the imaging mode is transmitted from the light emitting part 33 of the electric vacuum cleaner main body 11 to the beacon device 60 (Step 51). In the beacon device 60, when it receives the request signal from the electric vacuum cleaner main body 11 the beacon device control part 66 shifts to the imaging mode, and outputs guide signals from the beacon device left light emitting part 63L and the beacon device right light emitting part 63R of the beacon device light emitting part 63, respectively, and outputs a predetermined collision prevention signal from the beacon device sending part 65. At this time, in the beacon device control part 66, guide signals are output from the beacon device left light emitting part 63L, and the beacon device right light emitting part 63R of the beacon device light emitting part 63, respectively, in a direction crossing the direction indicated by the indicating part 72, that is, in the present embodiment, for example, in a direction crossing (orthogonal to) the front direction of the object P (the up-down direction in FIGS. 11A and 11B), that is, toward the display part 73 side. In other words, the direction in which the electric vacuum cleaner main body 11 is guided toward the beacon device 60 by the guide signals is a direction crossing (orthogonal to) the direction toward the object P. The guide signal SL that is transmitted from the beacon device left light emitting part 63L and the guide signal SR that is transmitted from the beacon device right light emitting part 63R can be distinguished from each other at the electric vacuum cleaner main body 11 side by making different the codes of these signals from each other or by outputting signals with the same code in a time-division manner. Therefore, after Step 51, the control part 37 judges whether there is a response from the beacon device 60 side (Step and when there is no response for a predetermined period of time, the control part 37 advances the process to Step 10 and then returns the process to Step 51. The control of this Step 10 is on the assumption that no response from the beacon device 60 side in Step 52 is caused by a state where the signal from the electric vacuum cleaner main body 11 has not been received by the beacon device 60 or the electric vacuum cleaner main body 11 is at a position at which it cannot receive a response from the beacon device 60, and is for searching for a position of the electric vacuum cleaner main body 11 from which signals can be received by the beacon device 60 or a position at which the electric vacuum cleaner main body 11 can receive signals from the beacon device 60 by making the electric vacuum cleaner main body 11 (main body case 20) move about inside the room R. Therefore, in this Step 10, the electric vacuum cleaner main body 11 (main body case 20) can find a position at which it can communicate with the beacon device 60 by being made, for example, turn at a current position or randomly travel or travel around a circle with a predetermined radius.

On the other hand, in Step 52, when judging that there is a response from the beacon device 60 side, the control part 37 drives the drive wheels 23 and 23 (motors 24 and 24) to make the electric vacuum cleaner main body 11 (main body case 20) travel for a predetermined distance toward the beacon device 60 according to the guide signals (Step 53).

Figure 14:
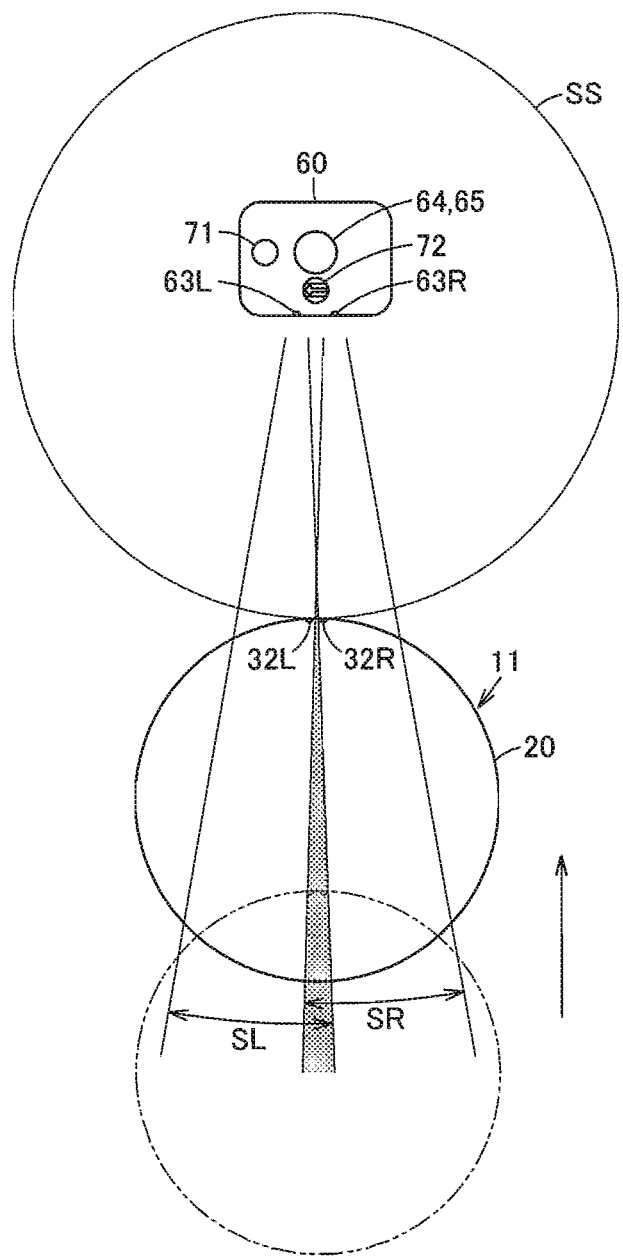
FIG. 14 is a plan view schematically showing a principle of guidance of the autonomously traveling body by the same beacon device.

At this time, the guide signals are output, as shown in FIG. 14, for example, radially (prolate elliptically) to the region at the left of the front of the beacon device 60 from the beacon device left light emitting part 63L and radially (prolate elliptically) to the region at the right of the front of the beacon device 60 from the beacon device right light emitting part 63R, respectively. These guide signals have codes (signs) that differ depending on an indicated direction indicated by the indicating part 72. That is, when the indicated direction indicated by the indicating part 72 is one predetermined direction, guide signals SL1 and SR1 are output from the light emitting parts 63L and 63R, and when the indicated direction indicated by the indicating part 72 is the other predetermined direction, guide signals SL2 and SR2 having codes different from those of the guide signals SL1 and SR1 are output from the light emitting parts 63L and 63R. In other words, depending on switching of the direction to be indicated by the indicating part 72, the guide signals to be transmitted from the beacon device light emitting part 63 differ. The electric vacuum cleaner main body 11 (main body case 20) controls driving of the drive wheels 23 and 23 (motors 24 and 24) so that when the electric vacuum cleaner main body 11 receives, for example, only the guide signal SL1 or guide signal SL2 first by the left light receiving part 32L of the light receiving part 32, the electric vacuum cleaner main body 11 travels relatively leftward, and when the electric vacuum cleaner main body 11 receives only the guide signal SR1 or the guide signal SR2 first by the right light receiving part 32R of the light receiving part 32, the electric vacuum cleaner main body 11 travels relatively rightward. Then, the electric vacuum cleaner main body 11 (main body case 20) can travel linearly toward the charging device 12 along a region (with a width of, for example, approximately 10 to 20 cm) in which the guide signals SL and SR overlap each other by controlling driving of the drive wheels 23 and 23 (motors 24 and 24) so as to travel at a position at which the electric vacuum cleaner main body 11 receives the guide signal SL1 or the guide signal SL2 by the left light receiving part 32L and receives the guide signals SL1 and SR1 or guide signals SL2 and SR2 by the right light receiving part 32R.

Next, the control part 37 judges whether the electric vacuum cleaner main body 11 has reached a position at a predetermined distance from the beacon device 60 based on whether the sensor part 31 has received the same collision prevention signal SS as in the embodiments described above (Step 54). Then, in this Step 54, when judging that the electric vacuum cleaner main body 11 has not reached the position at the predetermined distance from the charging device 12, the control part 37 returns the process to Step 52. In this Step 54, when judging that the electric vacuum cleaner main body 11 has reached the position at the predetermined distance from the beacon device 60, the control part 37 stops traveling at this position (Step 55), turns the main body case 20 at a predetermined angle (for example, 90 degrees) together with the camera 35 toward a direction indicated by the indicating part 72 according to codes of the guide signals received by the light receiving part 32 from the beacon device 60 (based on a difference between the guide signal SL1 and the guide signal SL2 or a difference between the guide signal SR1 and the guide signal SR2), that is, toward the object P by controlling driving of the drive wheels 23 and 23 (motors 24 and 24) (FIGS. 11A and 11B) to direct the camera 35 that was disposed on the front portion of the main body case 20 and directed toward the beacon device 60 toward the object P and image a still image of the object P, and stores this image data in the memory and transmits this image data to the external device by the wireless LAN device 36 via the network 15 (Step 56). That is, for example, when the indicating part 72 (direction indicating part 72a) is directed to the left side as viewed from the electric vacuum cleaner main body 11 (main body case 20), the guide signals SL1 and SR1 are transmitted from the beacon device light emitting part 63 of the beacon device 60, so that when these guide signals SL1 and SR1 are received by the light receiving part 32, the control part 37 controls the drive wheels 23 and 23 (motors 24 and 24) so as to turn the camera 35 at a predetermined angle to the left side (turn it at a predetermined angle counterclockwise) with respect to the traveling direction together with the main body case 20. Similarly, for example, when the indicating part 72 (direction indicating part 72a) is directed to the right side as viewed from the electric vacuum cleaner main body 11 (main body case 20), the guide signals SL2 and SR2 are transmitted from the beacon device light emitting part 63 of the beacon device 60, so that when these guide signals SL2 and SR2 are received by the light receiving part 32, the control part 37 controls the drive wheels 23 and 23 (motors 24 and 24) so as to turn the camera 35 at a predetermined angle to the right side (turn it at a predetermined angle clockwise) with respect to the traveling direction together with the main body case 20, Therefore, the control part 37 controls the drive wheels 23 and 23 (motors 24 and 24) so as to direct the camera 35 toward the direction indicated by the indicating part 72. The turning angle of the main body case 20 is determined by the control part 37 based on a difference in the number of rotations between the left and right motors 24 and 24 detected by the sensor part 31.

Then, after imaging is finished, the control part 37 transmits a request signal for requesting ending of the imaging mode from the light emitting part 33 (Step 57). Then, when the beacon device 60 receives this request signal by the beacon device light receiving part 64, the beacon device control part 66 stops transmission of the guide signals from the beacon device light emitting part 63 and shifts to the standby mode (Step 58), and when the charging device 12 receives this request signal by the charging device light receiving part 56, the charging device control part 58 transmits guide signals from the charging device light emitting part 55 (Step 59). Step 17 to Step 20 after this Step 59 are the same as in the embodiments described above.

Thus, in the case of imaging the object P with the camera 35 by guiding the electric vacuum cleaner main body 11 to a predetermined position near the object P by the guide signals SL and SR from the beacon device 60, if the disposition of the beacon device 60 is not appropriate, the electric vacuum cleaner main body 11 cannot be guided to a position suitable for imaging with the camera 35. Therefore, in the fourth embodiment described above, the beacon device 60 is provided with the indicating part 72 that can variably set the direction that is to be directed toward the object P, and the direction in which the guide signals (guide signals SL and SR) for guiding the electric vacuum cleaner main body 11 toward the beacon device 60 are transmitted from the beacon device light emitting part 63 is shown by the display part 73. In the electric vacuum cleaner main body 11, after the control part 37 makes the main body case 20 approach the beacon device 60 to a position at a predetermined distance from the beacon device 60 in line with the guide signals received by the light receiving part 32, the control part 37 performs imaging with the camera 35 in the direction indicated by the indicating part 72 based on the guide signals SL and SR, so that the beacon device 60 can be easily disposed so as to obtain an image that reliably captures the object P positioned in the direction indicated by the indicating part 72 while reliably guiding the electric vacuum cleaner main body 11 to the predetermined position (imaging position) toward the beacon device 60.

From the beacon device light emitting part 63, guide signals (guide signals SL1 and SR1 or guide signals SL2 and SR2) having codes that differ depending on the direction indicated by the indicating part 72 are transmitted, and the control part 37 controls driving of the drive wheels 23 and 23 (motors 24 and 24) so as to direct the camera 35 toward the object by the camera 35 at a predetermined angle corresponding to the codes of the guide signals when the main body case 20 reaches the position at the predetermined distance from the beacon device 60, so that, for example, even in the case where the installation position of the beacon device 60 is limited by the layout of the room R or the position of the object P (cage C), etc., the object P can be more appropriately imaged with the camera 35 by changing the direction to be indicated by the indicating part 72.

The guide signals to be transmitted from the beacon device 60 are output only when it receives a request signal from the electric vacuum cleaner main body 11, so that the battery can be made to last a longer time.

In the beacon device 60, the transmission direction of signals from the beacon device light emitting part 63 is only a fixed predetermined direction, and the orientation in which the beacon device 60 is disposed is set by a user according to the indicating part 72, so that the beacon device 60 can be made simpler in constitution and smaller in size than in the case where the beacon device 60 is constituted so as to transmit signals in a plurality of directions from the beacon device light emitting part.

Further, by turning the camera 35 at a predetermined angle toward the object P together with the main body case 20 when the main body case 20 (electric vacuum cleaner main body 11) reaches the position at the predetermined distance from the beacon device 60 in the imaging mode, without imaging the beacon device 60 that has guided the main body case 20, only the object P positioned in the direction indicated by the indicating part 72 can be reliably imaged with the camera 35.

In detail, by making the main body case (electric vacuum cleaner main body 11) travel so as to approach the beacon device 60 in line with the guide signals SL1 and SR1 or the guide signals SL2 and SR2 received by the light receiving part 32 (light receiving parts 32L and 32R), and performing imaging with the camera 35 in the direction indicated by the indicating part 72 when the main body case 20 (electric vacuum cleaner main body 11) reaches the position at the predetermined distance from the beacon device 60, only the object P positioned in the direction indicated by the indicating part 72 can be reliably imaged with the camera 35 while reliably guiding the electric vacuum cleaner main body 11 to the predetermined position (imaging position) without imaging the beacon device 60 that has guided the main body case 20. By transmitting the image data to an external device, the image data can be confirmed with the external device. Therefore, a convenient electric cleaning device 10 with which the condition of the object P inside the room can be easily and reliably monitored from the outside by using the external device can be provided.

In the imaging mode, the control part 37 directs the camera 35 toward the set direction (direction indicated by the indicating part 72) by turning the electric vacuum cleaner main body 11 (main body case 20), so that the drive wheels 23 and 23 (motors 24 and 24) that enable the main body case 20 to travel can be used as they are for changing the direction of the camera 35, so that separate constitutions and controls for changing the direction of the camera 35 are unnecessary, and the constitution and the control can be further simplified.

In the fourth embodiment described above, the charging device 12 and the beacon device 60 are provided separately, however, each may be constituted as a device that has the functions of both of these devices.

The indicating part 72 is not limited to a direction indicating switch, and for example, it is also possible that a switch for operation and a plurality of light emitting units (light emitting bodies) such as LEDs are used, and by changing the light emitting directions (light emitting positions) and emitting light colors of the light emitting units (light emitting bodies) by an operation of the switch, a direction to be indicated is shown.

Further, the direction to be indicated by the indicating part 72 is not limited to two, but the direction to be indicated may be switched among three or more directions, or may be switched in a stepless manner.

Instead of the display part 73, for example, an output window of the beacon device light emitting part 63 provided on the beacon device case 61 and an arrow or a mark such as an icon provided on the beacon device case 61 can be used, and it is also possible that the transmission direction of the guide signals from the beacon device light emitting part 63 is indicated by making the color of the side surface portion on which the beacon device light emitting part 63 is positioned of the beacon device case 61 different from colors of other side surface portions, or by the shape of the beacon device case 61 itself.

Further, the camera 35 is turned together with the main body case 20, however, it is also possible that, for example, the camera 35 is provided turnably separately from the main body case 20, and only the camera 35 is turned. In this case, it is preferable that a direction detection unit (direction detecting part) that detects the direction of the camera 35 etc., is provided to enable the control part 37 to monitor the direction of the camera 35.

The predetermined angle to turn the camera 35 may be changed according to an external signal corresponding to a user's input operation from an external device when the control part 37 receives the external signal by the wireless LAN device 36 in the imaging mode. In this case, a position regarded by the user as necessary to be imaged can be reliably imaged with the camera 35, and the convenience is further improved.

The fourth embodiment described above may be combined with the first to third embodiments described above, or the controls in the charging device 12 in the second and third embodiments may be applied to the beacon device 60 of the fourth embodiment.

Further, in the embodiments described above, in the imaging operation (imaging mode), for effectively using the power of the secondary battery 39, driving of the cleaning parts such as the electric blower 21, the side brushes 26 and 26 (side brush motors 27 and 27), and the rotary brush 28 (brush motor 29), etc., is stopped, however, when there is an excess in the remaining capacity of the secondary battery 39, these parts may be operated and cleaning may be performed simultaneously with the imaging operation.

When an imaging command signal is received during a charging operation of the secondary battery 39, the process may wait until the secondary battery 39 is charged to a predetermined capacity (for example, a capacity enabling reciprocating movement to and back from the object P, or fully charged), and after charging, the mode may be shifted to the imaging mode.

Further, the electric vacuum cleaner main body 11 is provided with a function as an autonomous traveling body, and the autonomously traveling body is not limited to one that performs cleaning, and may be one just for performing imaging with the camera 35.

In the case where communication between the network 15 and the wireless LAN device 36 is interrupted such as the case where the electric vacuum cleaner main body 11 enters a communication blind spot with the network 15 (access point 14) in the imaging mode, the electric vacuum cleaner main body 11 may be stopped at this position, or the electric vacuum cleaner main body 11 may be stopped after autonomously traveling to a predetermined position.

Further, wireless communication using the wireless LAN device 36 consumes power, so that in the state where the power of the secondary battery 39 is used, that is, during cleaning etc., communication using the wireless LAN device 36 is preferably suppressed. Therefore, it is also possible that when an imaging command signal is received in the cleaning mode, control is performed to inform a user that the electric cleaning device 10 is performing cleaning by using the wireless LAN device 36 via the network 15 and disregard the imaging command signal, and shifting to the imaging mode enabled only in the charging mode or the standby mode in which the electric vacuum cleaner main body 11 is connected to the charging device 12.

The mode is shifted to the imaging mode when an imaging command signal is received via an external device, however, it is also possible to constitute the electric cleaning device 10 so that, for example, when a predetermined time stored in advance begins, the mode automatically shifts to the imaging mode.

Further, it is also possible that image data imaged with the camera 35 in the imaging mode is not transmitted to an external device but is stored in the memory so as to be confirmed by a user when the user desires.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would tall within the scope and spirit of the inventions.

The invention claimed is:

1. A traveling body device comprising: an autonomously traveling body that is capable of autonomously traveling; and a beacon device that guides the autonomously traveling body, and capable of imaging an object, wherein
the beacon device includes a transmitting part that transmits a guide signal for guiding the autonomously traveling body corresponding to a set direction that is to be directed toward an object,
the autonomously traveling body includes:
a main body case including an imaging part that images an object,
a drive wheel that enable the main body case to travel,
a control part that makes the main body case autonomously travel by controlling driving of the drive wheel, and
a receiving part that receives the guide signal transmitted by the transmitting part, and
the control part has an imaging mode in which the control part makes the main body case travel so as to approach the beacon device in line with the guide signal received by the receiving part, and performs imaging in the set direction by the imaging part based on the guide signal when the main body case reaches a position at a predetermined distance from the beacon device.

2. The traveling body device according to claim 1, wherein
in the beacon device, a set direction that is to be directed toward an object is set in advance, and the beacon device transmits a guide signal in a direction at a predetermined angle with respect to the set direction.

3. The traveling body device according to claim 1, wherein
the control part directs the imaging part toward the set direction by making the main body case travel in the imaging mode.

4. The traveling body device according to claim 1, wherein
the control part turns the imaging part at a predetermined angle when the main body case reaches a position at a predetermined distance from the beacon device in the imaging mode.

5. The traveling body device according to claim 4, wherein
the control part performs imaging while turning the imaging part in increments of a predetermined angle in the imaging mode.

6. The traveling body device according to claim 4, wherein
the autonomously traveling body includes an external signal receiving part capable of receiving an external signal that is different from a guide signal to be transmitted front the transmitting part of the beacon device, and
the control part changes the predetermined angle to turn the main body case according to an external signal received by the external signal receiving part in the imaging mode.

7. The traveling body device according to claim 1, wherein
the control part makes the main body case travel in the set direction while avoiding the beacon device when the main body case reaches a position at a predetermined distance from the beacon device in the imaging mode.

8. The traveling body device according to claim 7, wherein
the autonomously traveling body includes an obstacle detecting part that detects obstacles, and when the main body case reaches a position at a predetermined distance from the beacon device in the imaging mode, in a case where no obstacle is detected on one lateral side of the beacon device by the obstacle detecting part, the control part makes the main body case travel toward the one lateral side of the beacon device and then travel in the set direction along the beacon device, and in a case where an obstacle is detected on one lateral side of the beacon device by the obstacle detecting part, the control part makes the main body case travel toward the other lateral side of the beacon device and then travel in the set direction along the beacon device.

9. The traveling body device according to claim 1, wherein
the autonomously traveling body includes a cleaning part that cleans a surface to be cleaned, and a signal receiving part that receives an imaging command signal from the outside, and
the control part interrupts cleaning being performed by the cleaning part and shifts to the imaging mode when the imaging command signal is received by the signal receiving part in the cleaning mode in which cleaning is performed by the cleaning part.

10. The traveling body device according to claim 1, wherein
the beacon device includes:
an indicating part capable of variably setting a direction that is to be directed toward an object, and
a display part that shows a direction of the guide signal to be transmitted from the transmitting part, and
the transmitting part transmits a guide signal for guiding the autonomously traveling body corresponding to a direction indicated by the indicating part.

11. The traveling body device according to claim 10, wherein
the transmitting part transmits a guide signal having a code which differs depending on a direction indicated by the indicating part, and
the control part directs the imaging part toward an object by turning the imaging part at a predetermined angle corresponding to the code of the guide signal when the main body case reaches a position at a predetermined distance from the beacon device.

* * * * *